United States Patent [19]
Terashita et al.

[11] Patent Number: 5,281,995
[45] Date of Patent: Jan. 25, 1994

[54] METHOD OF DETERMINING AN EXPOSURE FOR USE IN AN IMAGE FORMING APPARATUS

[75] Inventors: Takaaki Terashita; Keiko Yukawa, both of Kanagawa, Japan

[73] Assignee: Fuji Photo Film Co., Ltd., Kanagawa, Japan

[21] Appl. No.: 735,223

[22] Filed: Jul. 24, 1991

[30] Foreign Application Priority Data

Jul. 27, 1990 [JP] Japan .................................. 2-200986
Aug. 2, 1990 [JP] Japan .................................. 2-205528
Sep. 7, 1990 [JP] Japan .................................. 2-238282
Sep. 17, 1990 [JP] Japan .................................. 2-246540

[51] Int. Cl.⁵ .............................................. G03B 27/00
[52] U.S. Cl. ........................................ 355/68; 355/77
[58] Field of Search ............... 355/32, 35, 38, 68, 355/77; 358/76, 8 D; 364/525; 395/525, 900

[56] References Cited

U.S. PATENT DOCUMENTS 4,885,705 12/1989 Choi ..................... 364/525

FOREIGN PATENT DOCUMENTS 0411318  2/1991  European Pat. Off. .
56-153335 11/1981 Japan .
63-187139  8/1988 Japan .

Primary Examiner—D. Rutledge
Attorney, Agent, or Firm—Sughrue, Mion, Zinn, Macpeak & Seas

[57] ABSTRACT

Utilizing fuzzy theory, the exposure is determined based on an exposure operational formula defined for each of a plurality of previously classified patterns of a color original image. The color original image is divided into a multiplicity of portions for photometric purposes and, for the resulting photometric data, a plurality of features are evaluated. Utilizing fuzzy theory, a coincidence factor with a judging condition for judging the magnitude of the feature value is evaluated for each of the feature values. A coincidence factor for the pattern is evaluated from those coincidence factors to determine a weight for the pattern. Using this weight, a weighted mean of the exposures which is determined from the exposure operational formula is calculated to obtain a specific exposure.

19 Claims, 28 Drawing Sheets

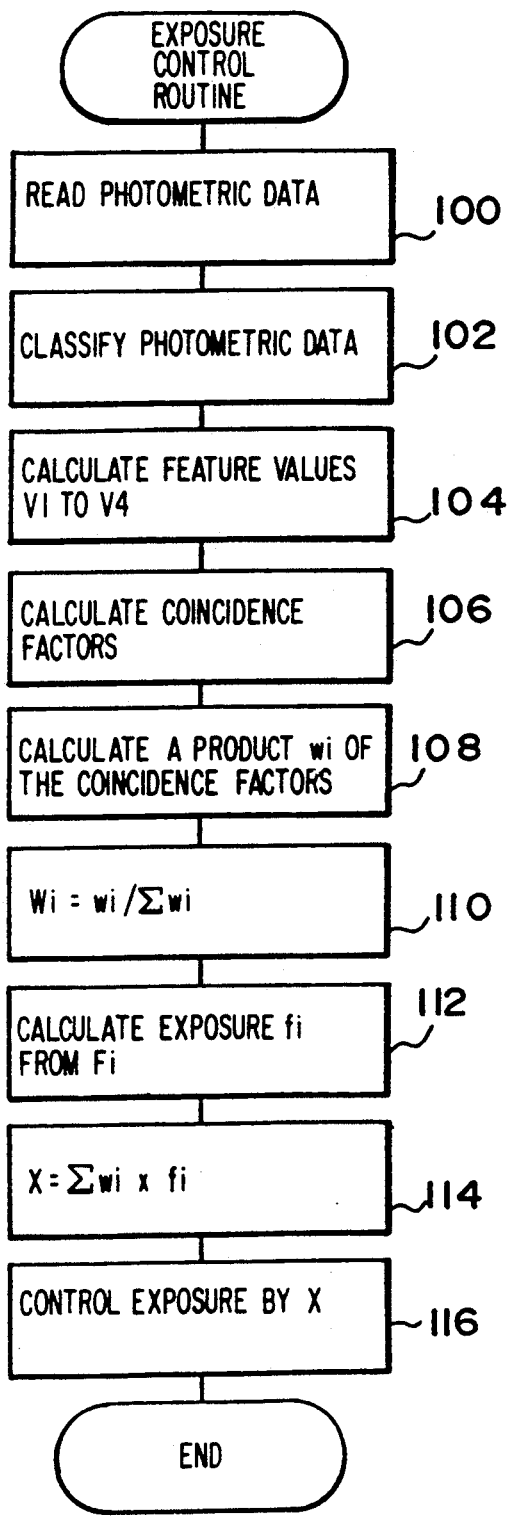

FIG. 6A
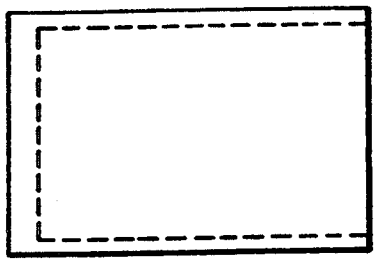
FIG. 6B
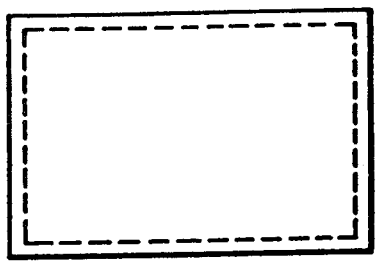
FIG. 6C
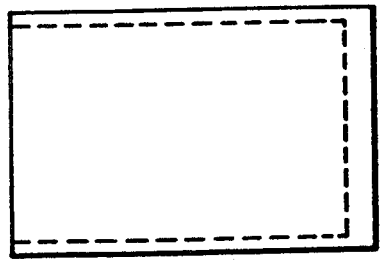
FIG. 7A
FIG. 7B
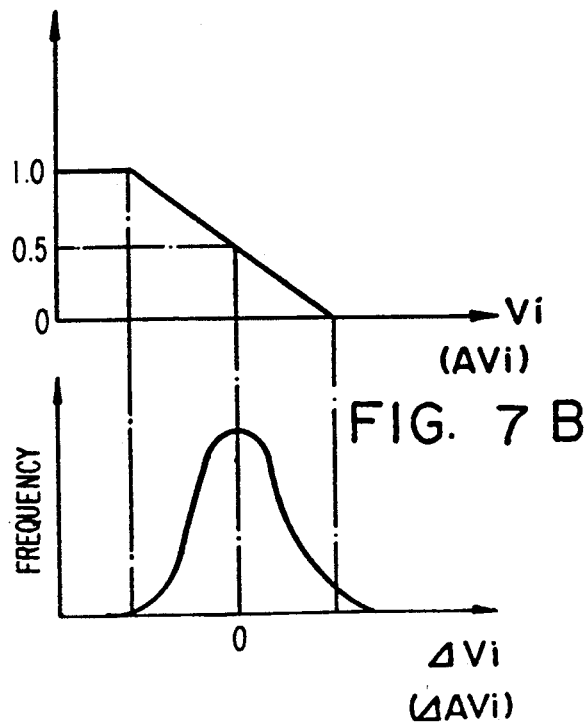

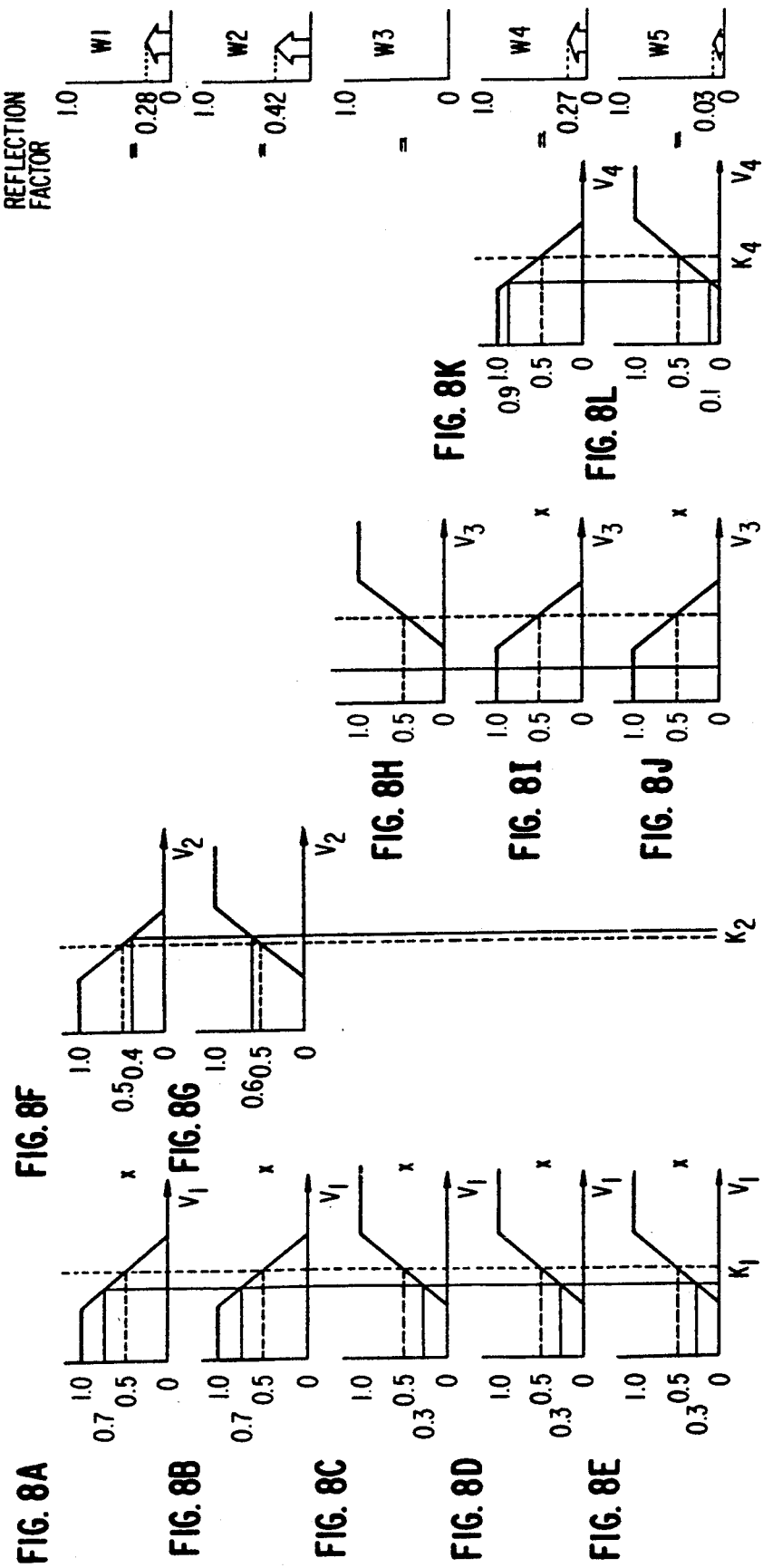

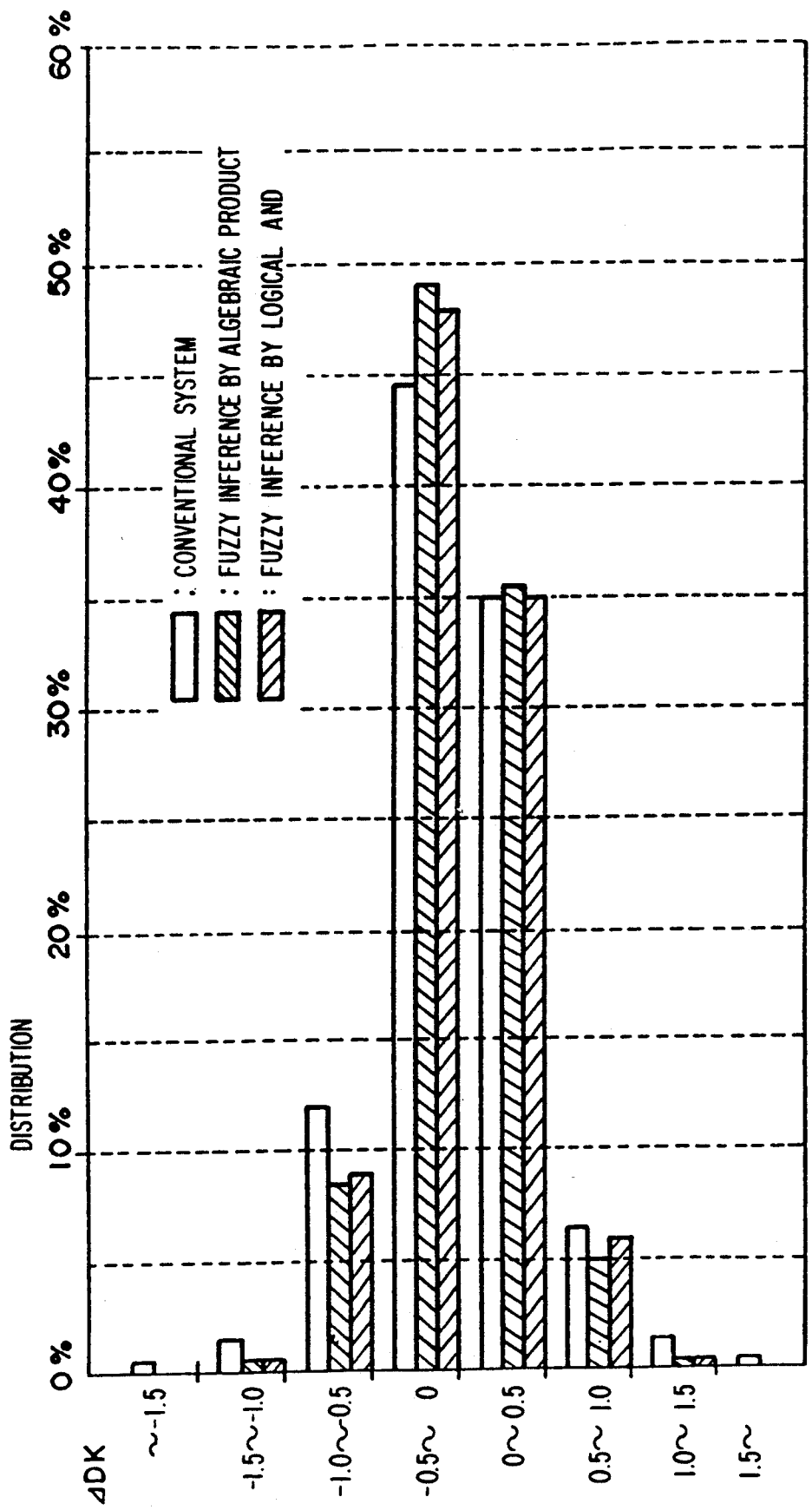

A, B, C: REGIONS A, B AND C

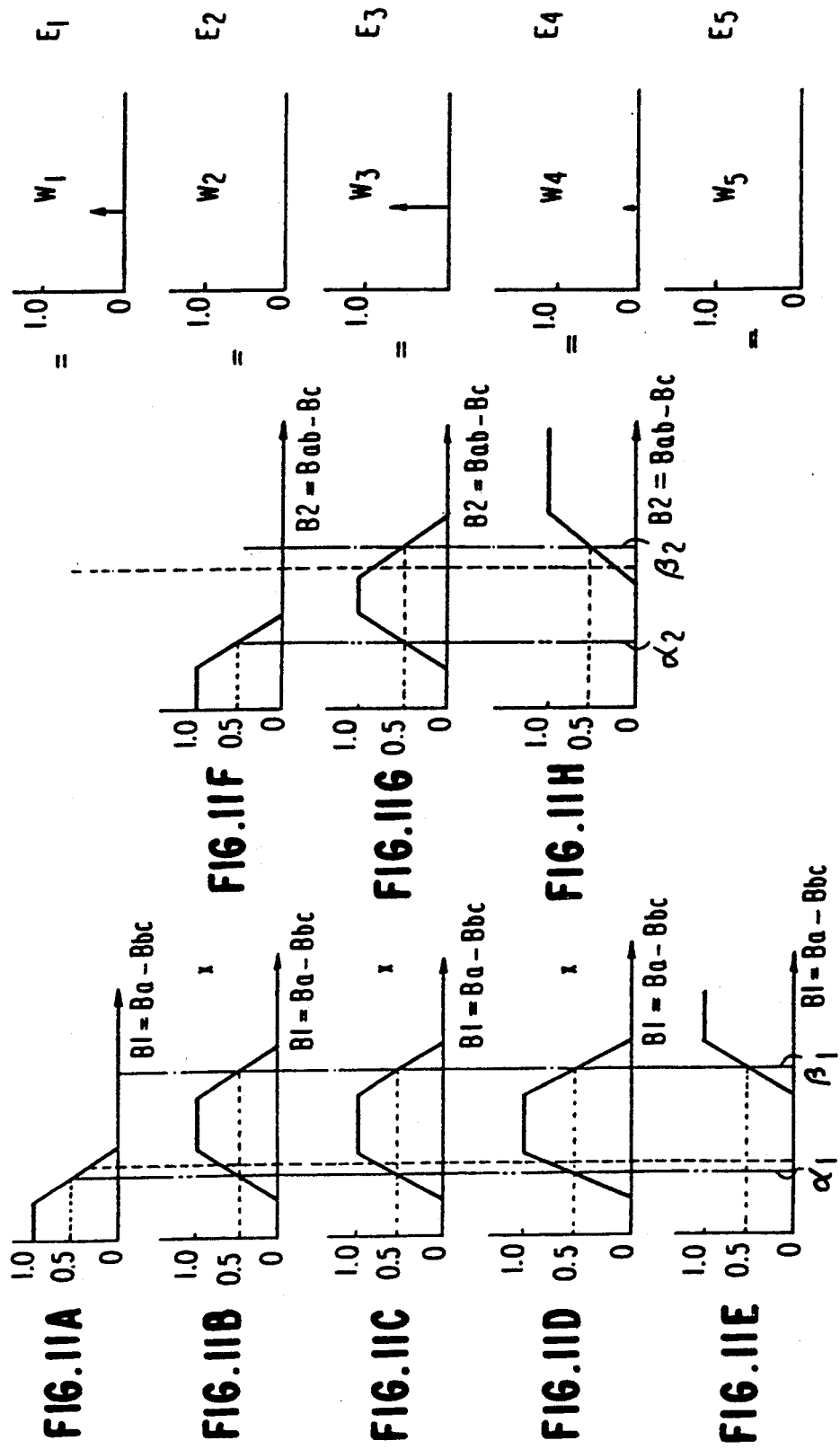

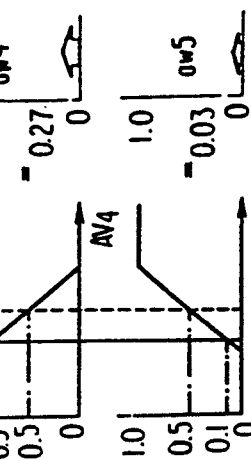 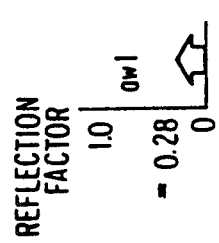 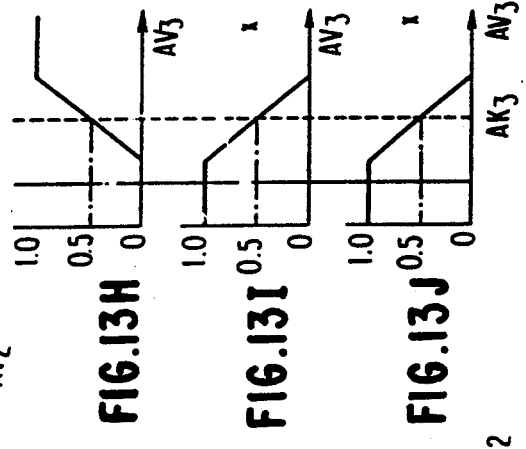 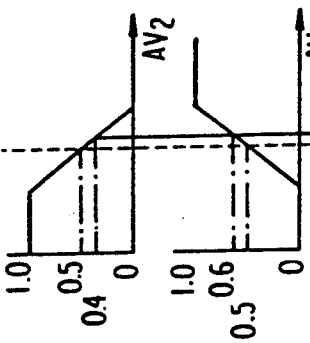  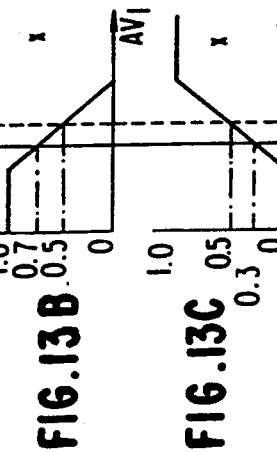 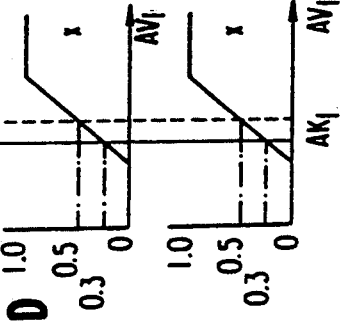
FIG. 13A FIG. 13B FIG. 13C FIG. 13D FIG. 13E FIG. 13F FIG. 13G FIG. 13H FIG. 13I FIG. 13J FIG. 13K FIG. 13L

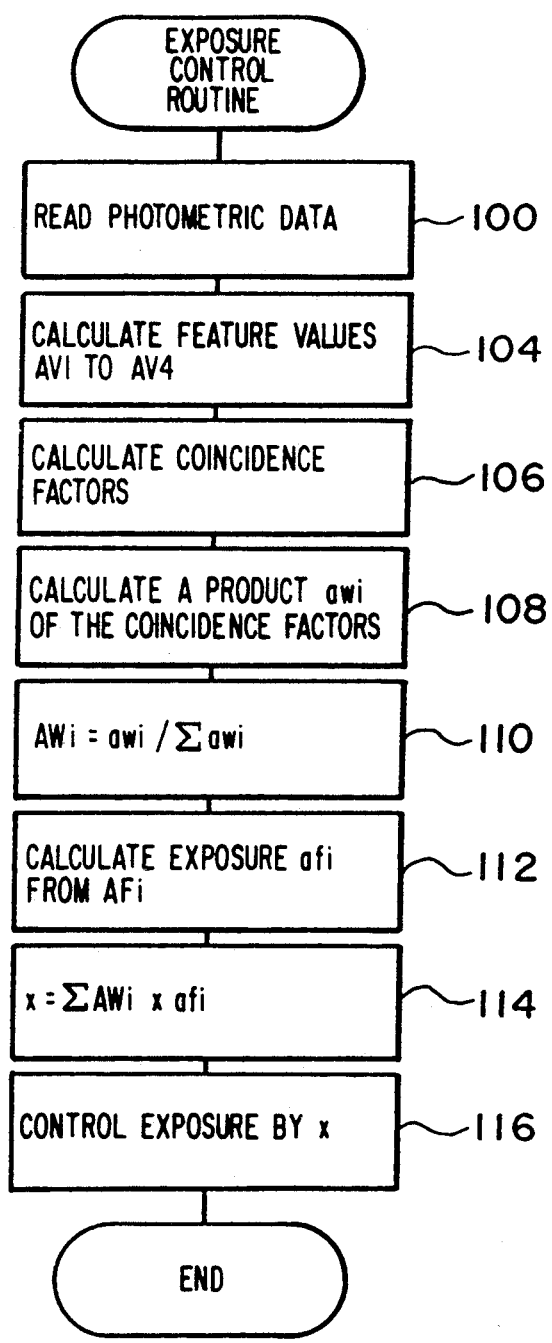

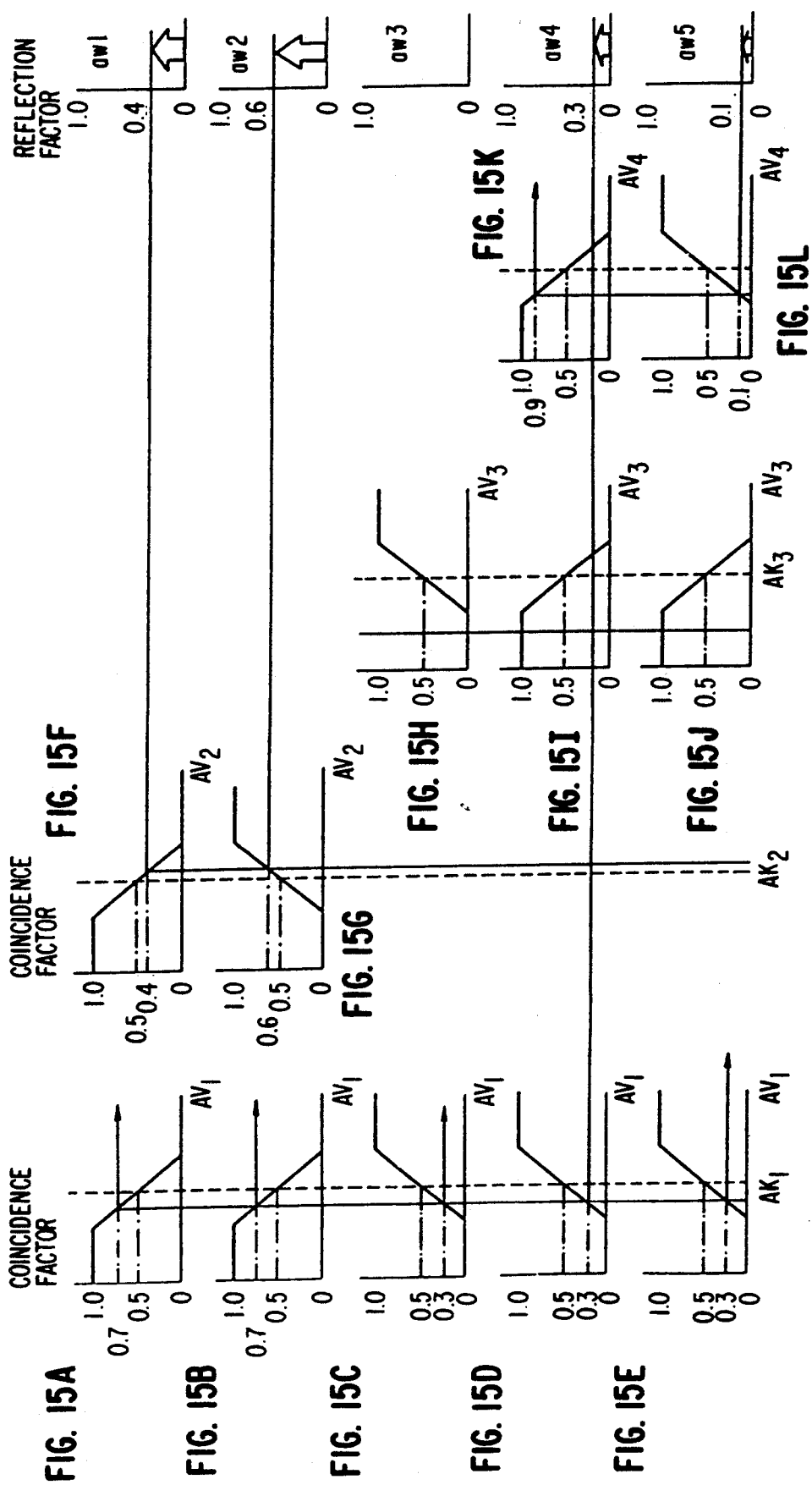

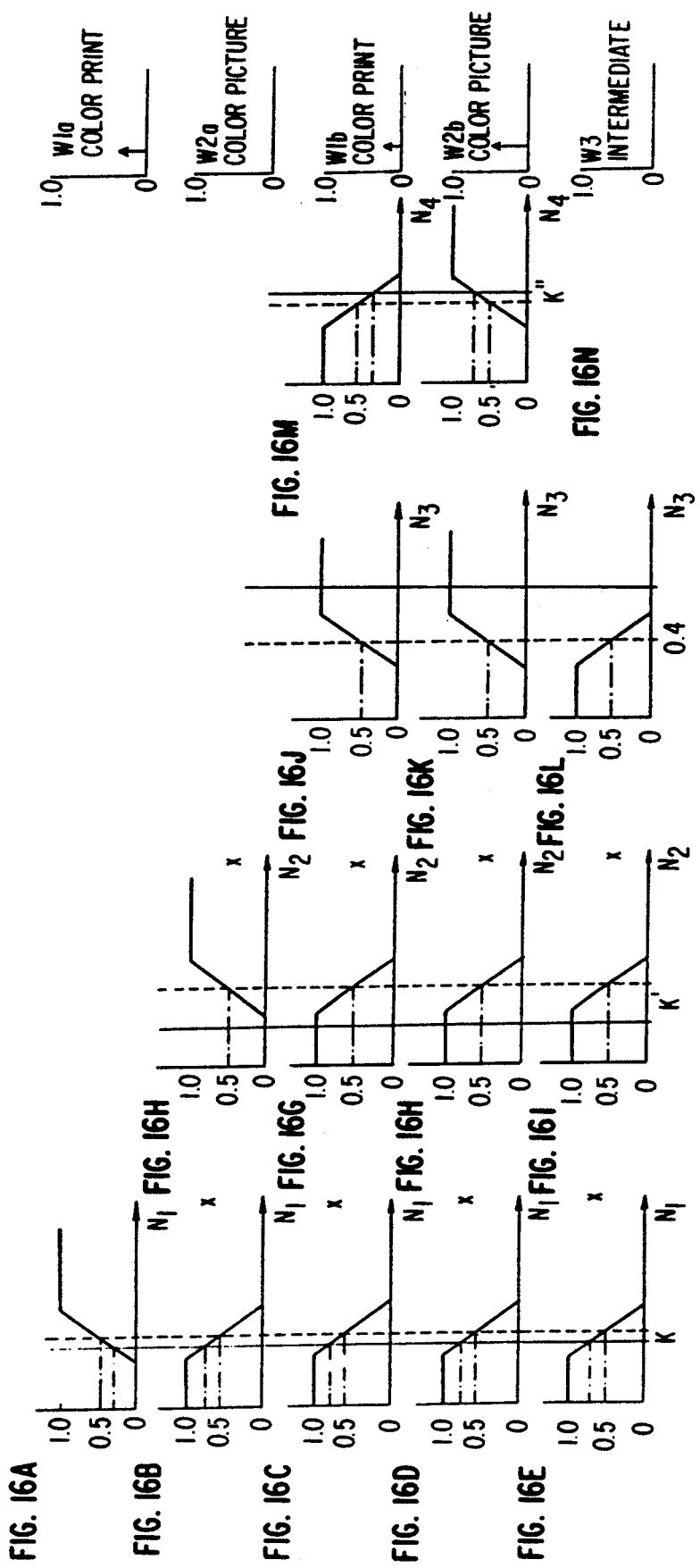

MEMBERSHIP VALUE

CONTROLLED VALUE
(COLOR CORRECTION VALUE)

INTEGRATED VALUE

CENTER OF
GRAVITY

CONTROLLED VALUE
(COLOR CORRECTION
VALUE)

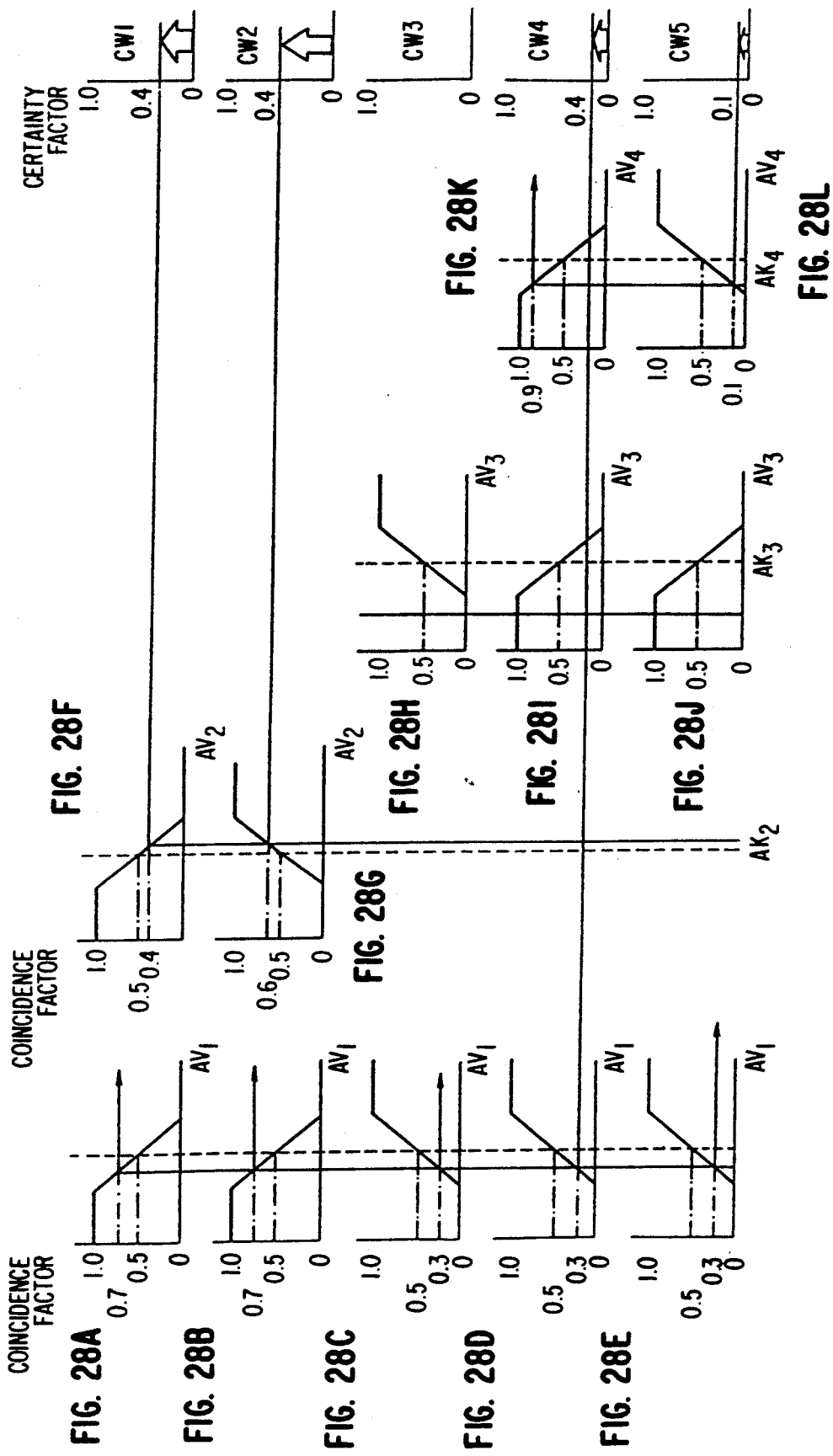

METHOD OF DETERMINING AN EXPOSURE FOR USE IN AN IMAGE FORMING APPARATUS

BACKGROUND OF THE INVENTION a) Field of the Invention

The present invention relates to a method of determining an exposure time in an image forming apparatus and particularly to the same method for, utilizing fuzzy theory, determining an exposure time in the image forming apparatus such as a picture printing apparatus, for example, an apparatus for automatically printing a color film image onto color paper, a camera, a laser printer, a copying machine, a printing scanner, an electronic still camera, a video camera or the like.

b) Description of the Related Art

Conventionally, in a color picture printing apparatus, an original image recorded on a film has been divided into a multiplicity of portions for photometric purposes and, from the resulting photometric data, some image features in a predetermined plurality of areas, that is, mean density, maximum and minimum densities or the like are evaluated for a plurality of predetermined regions to determine a printing exposure based on the image feature value for each area. In this case, since it is highly probable that the main portion of an object lies in the central portion of the original image, the original image is often divided into areas including the central portion and other areas to evaluate the image feature values. Then a weighting of the image feature value in the region including the central portion is increased to determine the exposure for printing. In the case of similar original images, as shown in FIGS. 2A and 2B, although they should suitably undergo the same exposure for printing, the image features of the regions 12 including the central portion of each original image can differ. However, according to a conventional method of determining the exposure, since the exposure is determined by increasing the weighting of the image feature value in the region including the central portion, the same exposures will not be obtained for them and the exposure varies for each of the similar images. Also in photographing with a camera, in which the exposure is determined based on photometric values from a plurality of photometric elements, the same problem occurs when the position of the camera relative to the same object differs slightly, and the same is also the case with a picture printing apparatus in which when the same original images are printed a plurality of times wherein the film setting position relative to the film carrier deviates each time.

In addition, different exposure conditions or exposure operational formulas expressed in the form of a linear function of the image feature values are each defined for a plurality of previously classified patterns (for example, for the open field scene and other scenes or a picture copy and printed copy) to select one of them so that, based on the selected one, the exposure is determined. The exposure condition or exposure operational formula is selected by judging a specific pattern through a combination of the results of a plurality of judging conditions, against which the image feature value and a predetermined value are compared.

However, a slight difference in the image feature value, which is caused by a slight difference in the image variation of the measured value due to electrical, optical and mechanical fluctuations during the photometric operation, exercises a great effect on the final pattern judgment of the image. If any one of the results of the judgments differs, then the judged pattern differs with the result that the selected exposure condition or operational formula will differ to cause a fluctuation of the exposure. Further, if, in order to gain a high performance image, the pattern is classified in more detail, then the fluctuation of the exposure can further be increased while at the same time the generality of the judging conditions is degraded.

Meanwhile, in addition to the above-described exposure condition or operational formula according to the above-described pattern, a plurality of different exposure conditions or operational formulas are each defined depending on the amount of photometric data for a plurality of predefined color regions (for example, color regions on the color coordinate divided into plural numbers) or the feature value in a specific color region such as the mean density or the like. The exposure operational formula is selected according to the combination of the results of judgment, which compare the image features with predetermined values. The exposure is determined based on the selected exposure conditions or operational formulae.

However, the amount of the photometric data for the color region or the density of the same region can be changed due to only a slight difference in the images or the variation of the measured values caused by the electrical, optical and mechanical fluctuations during the photometric operation or the like, and a slight difference in the image feature values exerts a great effect on the final judgment of the color region. If any one of the results of judgment differs, then the judged color region differs with the result that the selected exposure condition or operational formula will differ to cause the color change. In addition, if there is any variation in the background color or any effect caused by the light sources of different colors, then the amount of the photometric data or the fluctuation of the density for a specific color region is reduced and a slight difference in the results of judgment can cause a major color change resulting in color degradation.

Meanwhile, in the case of the electronic still camera or video camera or the like, the camera must correspond to the light quality of illuminating the object, which is prevailing at the place where a picture is taken. Therefore, in order to reproduce a white object in white under any illuminating condition to achieve a precise color tone, there is available a white balance adjusting unit. White balance adjusting is based on the principle that when the color components over the entire image are mixed an achromatic color results, and two systems are available therefor: a system for adjusting so that an integrated value of color difference signals (R−Y) and (B−Y) may become zero and a system for detecting and controlling a white portion by comparing a luminance signal Y, and color difference signals (R−Y), (B−Y) and (Y−B−R) contained within a video signal.

However, in accordance with the above-described systems, when a single color, prevails over the image, a color failure can occur. When there is no color close to white, an erroneous control can result such as turning the color yellow or the like, which is high in luminance, into white. In addition, conventionally, an automatic picture printing machine has been widely used, in which the film image is automatically stopped relative to the printing position and is divided into a multiple areas to measure light and, by analyzing the resulting photometric data, the exposure suitable for printing is automatically determined. However, since the acceptability factor of the prints by this machine is only 70 to 98%, it is necessary to change the exposure and reprint the unacceptable prints. This reprinting is frequently needed, in particular, in a printing machine, which requires a high quality such as for an enlarged print or the like.

Although, during reprinting, the previous printing condition is modified, in many cases, an expected printing quality cannot be achieved mainly because since setting positions of the film image differ slightly between the first and second time printings, the resulting photometric data or image feature values differ which hinders the reproducibility of determining the exposure. In particular, since the film image is automatically set to the printing position at the first printing and is manually set by operator by selecting the film frame at the second printing, a deviation between the film setting positions tends to become large. This problem also occurs when the image is additionally printed (reordered).

Incidentally, it is known how to determine the exposure of camera using a fuzzy logic, but it is not clear how to set a membership function and further a highly precise and complicated reasoning has been difficult to achieve because it is expressed in terms of a pure language value having no determined value stored within the judging condition.

SUMMARY OF THE INVENTION

The present invention w&s made in order to solve the above-described problems, and it is an object of the present invention to provide a method of determining an exposure for use in an image forming apparatus, which may prevent the exposure of the same or similar color images from varying as color images of an object, image recorded on a color film and a color hard copy or the like are copied.

In addition, it is another object of the present invention to provide a method of determining the exposure in an image forming apparatus, which may prevent the exposure from varying when the image recorded on the color film or image of the color copy is copied.

A further object of the present invention is to provide a method of controlling the exposure in an image forming apparatus, which may prevent a color fluctuation to achieve a stable and excellent color correction in an image forming apparatus such as a color picture printing apparatus, electronic still camera, video camera or the like.

It is a still further object to provide a method of determining an exposure in a copying machine, which may reduce the variation of the exposure to be determined for the variation of the film setting position.

In order to achieve the above-described ends, according to the present invention, there is provided a method of determining an exposure in a copying machine which may determine the exposure based on an exposure condition or an exposure operational formula set to each of a plurality of previously classified patterns comprising steps of:

dividing an original color image into a multiple number for photometric purpose;

evaluating a plurality of feature values of the original color image from data obtained by the photometric operation;

evaluating a coincidence factor of each of the evaluated feature values with each judging condition set for judging the magnitude of the feature value to determine a coincidence factor for each of the plurality of patterns using a plurality of the coincidence factors;

setting a weight for each pattern from the coincidence factor with the pattern; and applying the weight to each of the exposures determined from the above-described exposure condition or exposure operational formula to determine the exposure.

In a first aspect of the present invention, the coincidence factor for the above-described pattern can be determined by the product of the same and the coincidence factor with the above-described judging condition.

In addition, the coincidence factor with the judging condition is set according to the difference between a predetermined value and the above-described feature value. When the difference is 0, the coincidence factor can be set to between 0 and 1.0, and the coincidence factor with the judging condition can be set based on an emergence frequency distribution of the above-described feature value, and the coincidence factor when the emergence frequency is greatest can be set to between 0 and 1.0.

In the first aspect of the invention, when the exposure is determined based on the exposure condition or exposure operational formula set for each of the plurality of previously classified patterns, the original color film divided into a multiple number is photometrically measured and, from the resulting data, the plurality of feature values of the original color film is evaluated. As those feature values, the mean density, maximum density, minimum density for each of the plurality of regions of the color image, density difference in each photometric points, density histogram shape, color and the like or their combination, or mean luminance, maximum luminance, minimum luminance and the like or their combination can be adopted. Next, a degree of coincidence with each judging condition is evaluated. The condition determines the value set for each feature. A coincidence factor for each of the plurality of patterns is determined by calculating, for example, a product of the coincidence factors using plural coincidence factors with this judging condition to determine a weight for each pattern from the coincidence factor for this pattern. The greater the coincidence factor for the pattern becomes, the greater the weight becomes. Then the weight is applied, for example, to each of the exposures determined from the exposure condition or exposure operational formula to determine a final exposure.

The above-described coincidence factor with the judging condition can be set according to the difference between the predetermined value and the feature. At this time, the coincidence factor, when the difference is equal to 0, is set to between 0 and 1.0 and preferably at 0.5. In addition, the coincidence factor with the judging condition is set based on how frequently the magnitude of the feature emerges, and one for which the feature which emerges most frequently is set to between 0 and 1.0 and preferably at 0.5.

As described above, according to the first aspect of the invention, the weight for the pattern is determined from the coincidence factor with the feature value of the color image and the judging condition, and the weight is applied to each of the exposures evaluated from the exposure condition or exposure operational formula to determine the final exposure. As a result, scattering of the exposure for the same or similar original color images can be reduced. In addition, an excellent reproducibility can be obtained in determining the exposure for the same original color images.

In order to achieve the above-described end, in a second aspect of the invention, there is provided a method of determining the exposure for use in a copying machine wherein the exposure is determined based on the exposure condition or exposure operational formula set for each of the previously classified plurality of patterns comprising steps of:

dividing a color original image into a multiplicity of portions for photometric purpose;

evaluating a plurality of feature values for the color original image from the resulting data;

evaluating a coincidence factor for each of the feature values from a judging condition, the judging condition setting the coincidence factor so that the more the feature satisfies the judging condition the greater the coincidence factor becomes and vice versa;

synthesizing the coincidence factors with the judging condition to determine a coincidence factor for each of the plurality of patterns;

setting a weight for each pattern from the coincidence factor of the pattern; and determining the exposure by a weighted mean resulting from applying the weight to each of the exposures determined from the exposure condition or exposure operational formula.

According to the second aspect of the invention, the coincidence factor with the above-described judging condition may be determined according to the difference between the predetermined value and the feature value, and may be set to between 0 and 1.0 when the difference is 0. In addition, the above-described judging condition refers to a comparing condition between the feature value and the judged value, and when the feature value equals the judged value, the coincidence factor can be set to between 0 and 1.0. In addition, the exposure operational formula can be determined in the form of a functional formula of the feature values.

According to the second aspect of the invention, when the exposure is determined based on the exposure condition or exposure operational formula set for each of the previously classified plurality of patterns, the color original image is divided into a multiplicity of portions for photometric purpose and, from the resulting data, a plurality of features for the color original image is evaluated. As those features, the mean density, maximum density, minimum density or the like for each of the plurality of regions of the color image, or their combination may be used. Next, the coincidence factor is evaluated for each feature value from a plurality of judging conditions, The judging conditions each determine the coincidence factor so that the more the feature satisfies the judging condition the greater it becomes and vice versa. A plurality of the coincidence factors is combined to determine a coincidence factor for each of the plural patterns. From this coincidence for the pattern, a weight for each pattern is evaluated. In order to synthesize the coincidence factor, several methods are available: a method of calculating a product of the coincidence factors for synthesizing and a method of synthesizing the minimum coincidence factors and so forth. In addition, the weight becomes greater the greater the coincidence factor with the pattern becomes. Then the weight is applied to each of the exposures determined from the exposure condition or exposure operational formula to calculate the weighted mean to determine a final exposure. The exposure operational formula can be determined according to a feature function.

The coincidence factor with the above-described judging condition can be determined according to the difference between a predetermined value and a feature magnitude. At this time, the one is set to between 0 and 1.0 and preferably 0.5 when the difference equals 0. In addition, the judging condition may be used for comparing the feature value and the judged value so that when the feature magnitude equals the judged value the coincidence factor lies between 0 and 1.0 and is preferably set to 0.5.

As described above, according to the second aspect of the invention, the weight for the pattern is determined from the coincidence factor of the feature magnitude of the color original image with the judging condition and, by weighting each of the exposures determined according to the exposure condition or exposure operational formula, the final exposure is determined. As a result, the variation of the exposure resulting from a sight difference in images and the variation of the set values can be reduced. In addition, the fluctuation of the exposure for the same or similar color original images can be reduced to achieve a copied image of uniform color and density.

In order to achieve the above-described end, in a third aspect of the invention, there is provided a method of controlling an exposure for use in an image forming apparatus wherein the exposure is controlled based on an exposure condition or an exposure operational formula set for each of a plurality of divided color regions on a predetermined color coordinate comprising the steps of:

measuring R, G and B lights by dividing a color original image into a multiplicity of portions;

determining to which one of the divided regions on the coordinate the resulting photometric data belongs, to thereby classify the data;

evaluating feature values such as the amount of the photometric data for each color region or the mean photometric value and the like;

evaluating a coincidence factor for each of the feature magnitudes from a plurality of judging conditions, the judging conditions each determining the coincidence factor so that the more the feature magnitude satisfies the judging condition the greater it becomes and vice versa;

synthesizing a plurality of coincidence factors with the judging condition to determine a coincidence factor with a plurality of the exposure conditions or exposure operational formulae;

determining a weight for each color region from the coincidence factor for the color region; and controlling an exposure by a weighted mean applied with the above-described weight to each of the exposure determined from the exposure condition or exposure operational formula.

According to the third aspect of the invention, the exposure can be determined by setting the weight, which varies according to the color difference or the value of the color ratio, or the weight which varies according to the amount of photometric data belonging to the above-described specific region, for each of the classified regions.

In addition, the exposure operational formula can be expressed in the form of a functional formula between the above-described feature magnitudes.

According to the third aspect of the invention, the exposure is controlled based on the exposure condition or exposure operational formula set for each of the plurality of regions on the coordinate. In this case, the color original image is divided into a multiplicity of portions for photometric purposes and, from the resulting data, a plurality of feature values of the color original image is evaluated. As those feature values, the amount of photometric data, mean density, maximum density, minimum density or the like for each region or a combination of those values and the operational values by a plurality of photometric data can be used. Next, for each feature magnitude, the coincidence factor is evaluated from the plurality of judging conditions. The plurality of judging conditions sets the coincidence factor so that the more the feature magnitude satisfies the judging condition the greater it becomes and vice versa. A plurality of those coincidence factors is synthesized to each determine the coincidence factor for the plurality of exposure condition or exposure operational formula and, from that coincidence factor, the weight for the exposure condition or the exposure operational formula is determined. In order to synthesize the coincidence factors, several methods are available: a method of calculating a product of the coincidence factors for synthesizing and a method of synthesizing the minimum values of the coincidence factors (logical OR) or the like. In addition, the weight becomes larger the greater the coincidence factor for the region becomes. A final exposure is determined by calculating a weighted mean by applying the weight to each of the exposure determined from the exposure condition or exposure operational formula. Of those, the later can be expressed in the form of a function of the feature values.

As described above, according to the third aspect of the invention, the weight for the divided color regions is determined from the coincidence factor of the feature value of the color original image with the judging condition and the final exposure is determined by applying the weight to each of the exposures, which are determined from the exposure condition or exposure operational formula. As a result, the variation of the amount of the photometric data for the color region or the density fluctuation for the divided color region can be reduced. In addition, since the weight is determined for the divided color region from the coincidence factor of the color original image with the judging condition, the daylight and the artificial light, which obviously differ in scattering of the color regions, can be discriminated and a stable effect can be achieved for the mixed light source.

In order to achieve the above-described end, in a fourth aspect of the invention, the color film image is divided into a multiplicity of portions for photometric purpose and, for the resulting image data, certainty factors of the above-described image data is each evaluated from a membership function of the image data relative to the displacement of the film image at an aperture portion of a film carrier, and they are synthesized to evaluate the weight, so that by using the image data at the photometric points and the weight the exposure is determined.

According to the fourth aspect of the invention, the color film image is divided into a multiplicity of portions for photometric purpose and, for the resulting image data, the certainty factors of the image data are evaluated by the membership function of the image data relative to the displacement of the film image at the aperture portion of the film carrier. This certainty factor, when the photometric point exists in a predetermined region, becomes greatest and the nearer it lies to this predetermined region the greater it becomes. The above-described certainty factors are synthesized to evaluate the weight, which is applied to the image data at the photometric point to determine the exposure. The present invention applies a fuzzy theory to the determination of the exposure. Since the weight is determined from the certainty factor, which becomes greatest when the photometric point is present in the predetermined region, even if the film or the like deviates from the regular position, a strong correlation can be obtained between the exposure at the regular position and that at the deviating position to reduce variation of the exposure.

As described above, according to the present invention, since fuzzy theory is used, even if the deviation of position takes place, a strong correlation can be obtained between the exposures with the result that the acceptability can be increased by reducing the variation of the exposures.

BRIEF DESCRIPTION OF THE DRAWINGS

FIG. 1 is a flow chart illustrating an exposure control routine according to a first embodiment of the present invention;

FIGS. 6A, 6B and 6C are respectively a diagrammatic view illustrating a displacement of the photometric regions relative to the screen;

FIGS. 7A and 7B are respectively a diagrammatic view illustrating a relationship between a histogram and a membership function;

FIGS. 8A through 8L are respectively a diagrammatic view illustrating a membership function and the like according to the first embodiment;

FIG. 9 is a diagrammatic view illustrating the distribution of an exposure fluctuation caused by displacement of the position where the film is set;

FIGS. 11A through 11H are respectively a diagrammatic view illustrating a membership function and the like according to the second embodiment;

FIGS. 13A through 13L are respectively a diagrammatic view illustrating a membership function of the fuzzy theory by algebraic product and the like according to a third embodiment;

FIG. 14 is a flow chart illustrating an exposure control routine according to the third embodiment;

FIGS. 15A through 15L are respectively a diagrammatic view illustrating a membership function of the fuzzy theory by logical AND and the like according to the third embodiment;

FIGS. 16A through 16L are respectively a diagrammatic view illustrating a membership function and the like according to a fourth embodiment;

FIGS. 28A through 28L are respectively a diagrammatic view illustrating a membership function of the fuzzy theory by logical AND and the like;

DETAILED DESCRIPTION OF THE PREFERRED EMBODIMENTS

Several embodiments according to the present invention are hereinafter described in greater detail with specific reference to the accompanying drawings.

Figure 2A:
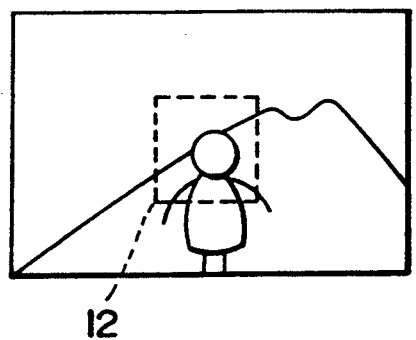
FIGS. 2A and 2B are respectively diagrammatic views illustrating a position of photometric regions relative to similar images
Figure 2B:
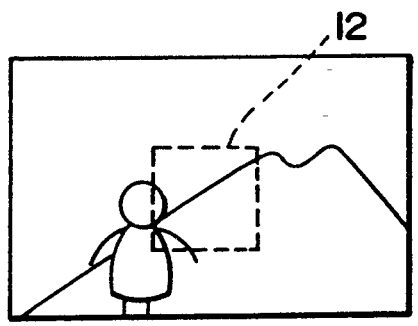
Figure 3:
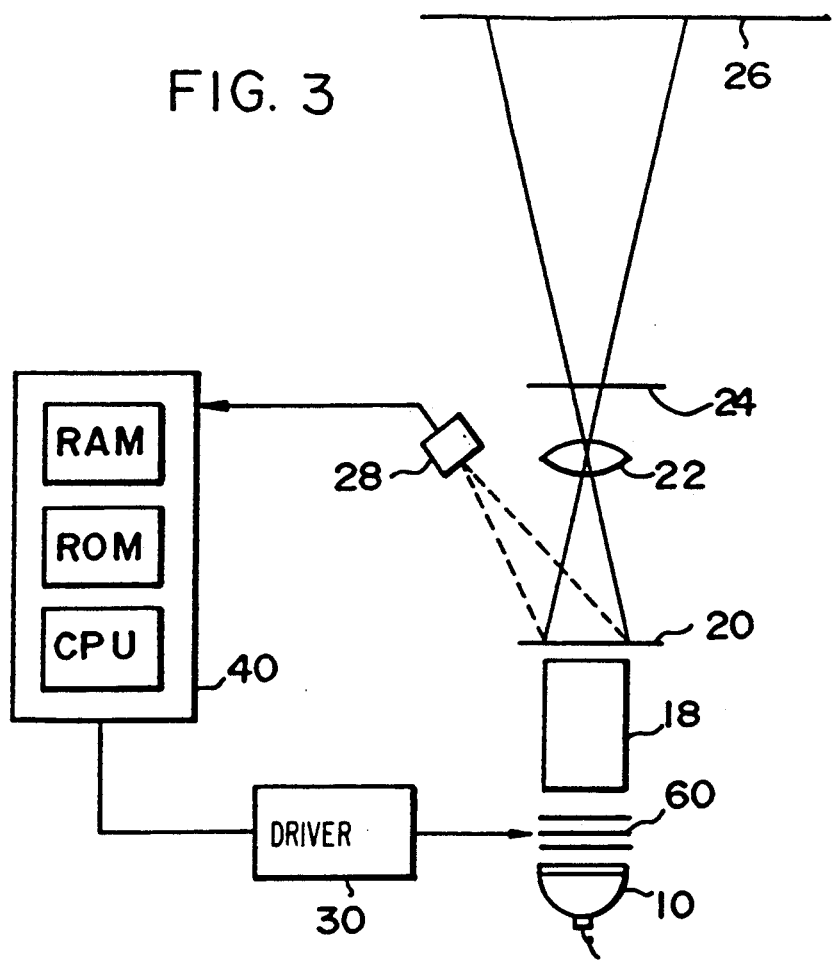
FIG. 3 is a schematic view of a color picture printing apparatus to which the present can be applied.

A first embodiment relates to a first aspect of the present invention applied to a color picture printing apparatus, and in FIG. 3, the apparatus which allows the first invention to be applied is schematically illustrated. A mirror box 18 and a lamp house 10 having a halogen lamp are disposed downwardly of a color negative film 20, which is conveyed to a printing portion loaded within a film carrier (not shown). Disposed between the mirror box 18 and the lamp house 10 is a dimmer filter 60, which, as well known, is comprised of three filters: an Y (yellow) filter, M (magenta) filter and a C (cyan) filter.

Upwardly of the negative film 20, a lens 22, a black shutter 24 and color paper 26 are sequentially disposed so that light beams which, illuminate from the lamp house 10, pass through the dimmer filter 60, mirror box 18 and the negative film 20 may form an image on the color paper 26 by the lens 22.

Figure 4:
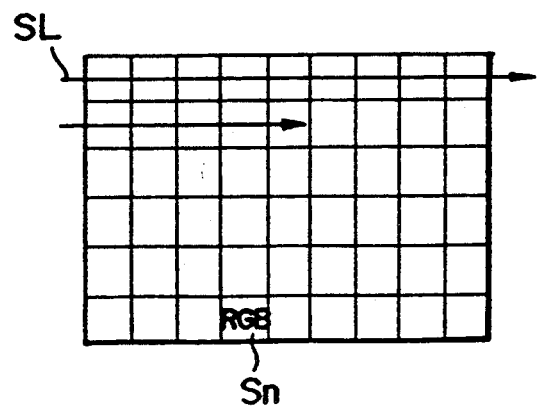
FIG. 4 is a diagrammatic view illustrating how a sensor divides a screen into portions for the photometric purpose.

A sensor 28 is disposed in a direction running obliquely relative to the optical axis of the above-described image forming optical system and at a position where the image density of the negative film 20 can be measured. The sensor 28 is comprised of a two-dimensional image sensor, a line sensor and the like, which comprises a CCD (charge-coupled device), to divide a negative image into a multiplicity of pixels Sn, as shown in FIG. 4, to scan them along a scanning line SL. In this case, the photometric operation for each pixel is performed for three primary colors: B, G and R. This sensor 28 allows the position data and the photometric data for each pixel to be detected.

The sensor 28 is connected to an exposure control circuit 40, which calculates an exposure control value to control the dimmer filter 60 via a driver 30 to control the exposure. This exposure control circuit 40 comprises a microcomputer, which is comprised of a program of the exposure control routine as shown in FIG. 1, a read-only memory (ROM) for storing a membership function and the like (described later), a random access memory (RAM) and a central processing unit (CPU). Incidentally, as such a microcomputer, one having a digital fuzzy chip is suitable.

Figure 5:
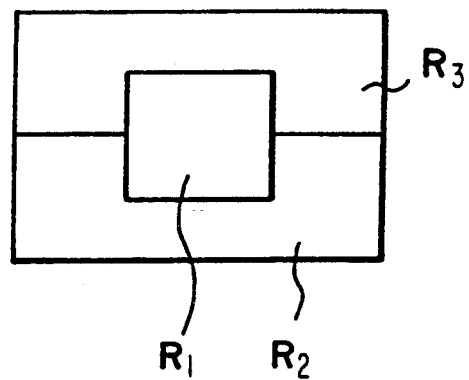
FIG. 5 is a diagrammatic view illustrating how the screen is divided.

Next, a fuzzy control rule for the present invention is hereinafter described. First, in the present invention, as shown in FIG. 5, the screen of the color film is divided into three regions: a central region R1, a peripheral lower half region R2 and a peripheral upper half region R3. In addition, as the feature values obtained from the photometric data contained within each region R1, R2 and R3, the following ones V1, V2, V3 and V4 are used. Incidentally, although these features V1, V2, V3 and V4 are evaluated for each of the three colors R, G and B, the following description ignores that distinction.

V1: mean density of the central region R1 — mean density of the peripheral region of the screen (a region resulting by adding the peripheral lower half region R2 and the peripheral upper half region R3)

V2: mean density of the entire screen (a region resulting by adding the central region R1, peripheral lower half region R2 and the peripheral upper-half region R3 — minimum density of the entire screen V3: area factor of a portion having small difference in density between the photometric points relative to the peripheral region of the screen V4: maximum density of the peripheral lower half region R2 — minimum density of the entire screen As the fuzzy control rules, the following five rules (1) through (5) are used taking the form of "if . . . , then . . . ".

(1) If the feature value V1 is small and the feature value V2 is also small, then a weight, a reflection factor of the exposure obtained using an exposure operational formula F1 relative to the final exposure (actual value for controlling the exposure), is increased.

(2) If the feature value V1 is small and the feature value V2 is large, then the reflection factor of the exposure obtained by using an exposure operational formula F2 relative to the final exposure is increased.

(3) If the feature value V1 is large and the feature value V3 is also large, then the reflection factor of the exposure obtained by using an exposure operational formula F3 relative to the final exposure is increased.

(4) If the feature value V1 is large and the feature values V3 and V4 are small, then the reflection factor of the exposure obtained by using an exposure operational formula F4 relative to the final exposure is increased and (5) If the feature value V1 is large and the feature value V3 is small and the feature value V4 is large, then the reflection factor of the exposure obtained by using an exposure operational formula F5 relative to the final exposure is increased.

The above-mentioned language value, "large" and "small", are quantized by a membership function of the feature value Vi (where: i=1, 2, 3 and 4), which will be described later. This membership function is determined as follows. First, although the similar screens actually differ in image arrangement, let us assume that in many cases only the positions of a cardinal object within the screen differ and that the similarity between the screens is equivalent to a case where the screen and the photometric region are deviated. Under this assumption, the position of the photometric region relative to the screen is offset step by step in the lateral direction to form a histogram of a difference $\Delta Vi$ ($=Vi'-Voi$) between the feature value $Vi'$ as the photometric region is offset and the feature value $Voi$ (predetermined value) as it lies at the regular position as indicated by a dashed line of FIG. 6B. Incidentally, FIGS. 6A and 6C each illustrate a state in which the photometric region is offset to the right and left from the regular position. This histogram is as shown in FIG. 7B. The most frequent portion of this histogram is a portion (difference $\Delta Vi=0$) in which the feature value did not change although the photometric region is offset, meaning that the similarity of the screen is the highest. Therefore, the membership function is determined so that the membership value of the feature value Vi corresponding to the most frequent point on the histogram, that is the coincidence factor equals 0.5. Incidentally, it is possible to set the membership value of the feature value Vi corresponding to the most frequent point on the histogram to between 0.0 and 1.0. The positions where the membership value equals 1.0 and 0.0 may be made to coincide with the least frequent point on the histogram or its neighborhood, or may be made to coincide with a position lying between the most frequent and least frequent points.

When the membership function is determined according to the above-described method, the membership function of the feature value V1 is determined as shown in FIG. 8A for the rule (1), FIG. 8B for the rule (2), FIG. 8C for the rule (3), FIG. 8D for the rule (4) and FIG. 8E for the rule (5). In the membership function with the feature value Va1, the membership value is each set to 0.5 when V1=K1 (for example, 72, the value is a hundred times as large as the density value. The same is true of the following.) and its position is indicated by dotted line. In addition, as shown in FIG. 8F for the rule (1) and FIG. 8G for the rule (2), the membership function with the feature value V2 is determined so that when V2=K2 (for example, 61) the membership value equals 0.5. In addition, as shown in FIG. 8H for the rule (3), FIG. 8I for the rule (4) and FIG. 8J for the rule (5), the membership function for the feature value V3 is determined so that when V3=K3 (for example, 13) the membership value equals 0.5. As shown in FIG. 8K for the rule (4) and FIG. 8L for the rule (5), the membership function for the feature value V4 is determined so that when V4=K4 (for example, 106) the membership value equals 0.5. These membership functions are intended for determining the judging condition, meaning that as the membership value becomes greater the degree of the feature Vi with the judging condition becomes greater.

Incidentally, the distribution of the magnitude of the feature value Vi may be expressed in the form of a histogram so that the coincidence factor for the most frequent value Vi set to between 0 and 1.0 and preferably at 0.5. Incidentally, the above-described exposure operational formula F1 is determined so that an optimum exposure may be obtained when V1<K1 and V2<K2 (pattern 1). The exposure operational formula F2 when V1<K1 and V2≧K2 (pattern 2), the operational formula F3 when V1≧K1 and V3≧K3 (pattern 3): the operational formula F4 when V1≧K1 and V3<K3 and V4<K4 (pattern 4) and the operational formula F5 when V1≧K1 and V3<K3 and V3≧K4 (pattern 5).

The membership function and the exposure operational formula are determined as above and stored in advance within the ROM of the exposure control circuit 40.

Next, referring to FIG. 1, an exposure control routine according to the present invention for controlling the exposure is described using the above-described membership function. In step 100, the photometric data detected by the sensor 28 is taken in, and, in Step 102, it is determined to which one of the divided regions R1, R2 and R3, as shown in FIG. 5, each of the photometric data belongs, to classify all the photometric data. In Step 104, the above-described feature values V1 through V4 are calculated using the photometric data classified above. In the next step 106, in accordance with the above-described fuzzy control rules (1) to (5), the coincidence factor corresponding to the feature values V1 to V4 is calculated from the membership function as shown in FIG. 8, that is, the coincidence factor with the judging condition is calculated for the feature values V1 through V4. In step 108, the product wi of the coincidence factors for each of the rules 1 through 5, that is, the coincidence factor for each of the patterns 1 through 5 are calculated. This coincidence factor for the pattern is described below as the reflection factor because it represents the reflection factor of the exposure evaluated from each operational formula for the final exposure. In an example shown in FIG. 8, since for the rule (1), the coincidence factor for the feature value Vi, that is, the membership value is 0.7 (indicated by solid line. The same shall apply hereinafter.) and the coincidence factor for the feature value V2 is 0.4, the reflection factor w1 becomes 0.7×0.4=0.28. For the rule (2), since the coincidence factor for the feature value VI is 0.7 and the coincidence factor for the feature value V2 is 0.6, the reflection factor w2 becomes 0.7×0.6=0.42. For the rule (3), since the coincidence factor for the feature value V1 is 0.3 and the coincidence factor for the feature value V3 is 0, the reflection factor w3 becomes 0.3×0=0. For the rule (4), the coincidence factor for the feature value V1 is 0.3 and the coincidence factor for the feature value V3 is 1.0 and the coincidence factor for the feature value V4 is 0.9, the reflection factor w4 becomes 0.3×1.0×0.9=0.27. For the rule (5), since the coincidence factor for the feature value V1 is 0.3, the coincidence factor for the feature value V3 1.0 and the coincidence factor for the creature value V4 0.1, the reflection factor w5 becomes $0.3 \times 1.0 \times 0.1 = 0.03$.

In the next step 110, a normalizing operation is performed in accordance with the following formula.

$$Wi = wi / \sum_{i=1}^{5} wi \quad (1)$$

When normalized as above, $$\sum_{i=1}^{5} wi = 1.0.$$

In the next step 112, the exposure fi is calculated in accordance with each operational formula Fi (where: i=1, 2 ... 5) and, in step 114, a weight corresponding to the normalized reflection factor Wi is applied to each of the exposures fi and the value integrated in accordance with the formula (2) is adopted at the final exposure X.

$$X = \sum_{i=1}^{5} Wi \times fi \quad (2)$$

Figure 10A:
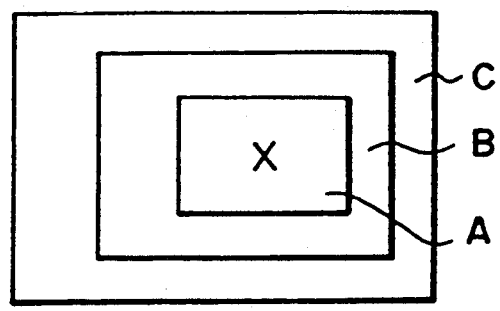
FIG. 10A is a diagrammatic view illustrating the screen divided into regions in accordance with a second embodiment.
Figure 10B:
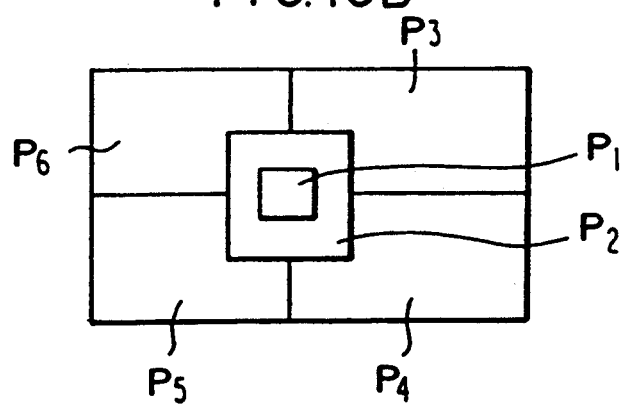
FIG. 10B is a diagrammatic view illustrating the layout of a photometric element used in the second embodiment.

By driving a driver 30 by an exposure control value determined by this final exposure (see FIG. 3) value X, the position of the dimmer filter 60 is controlled to control the exposure. In FIG. 9, the variation of the exposure according to this embodiment (fuzzy inference by algebraic product), which is caused by the offset of the film setting position as the exposure is controlled as above using the identical original images, is shown as compared with those for the conventional example and a compared example (fuzzy inference by logical AND). In the same figure, $\Delta$DK denotes a change of the exposure caused by the deviation of the film setting position, corresponding to 10% of the change of the exposure with a change of 0.5. Incidentally, the fuzzy theory by logical AND adopts as the conclusion part (then ...) the coincidence factor which becomes minimum at the conditional part (if ...) of the rules (1) to (5). As will be appreciated from the figure, in the fuzzy reasoning by algebraic product and fuzzy inference by logical AND, the distribution is elevated at the portion where $\alpha$DK is smaller (0, 0−0.5−0.5−0.0) than the current reasoning. It is appreciated that even if the film setting position deviates the change of the exposure is small. In addition, in fuzzy inference by algebraic product according to the present invention, the change of the exposure relative to the displacement of the film setting position is lessened, and when the product of the coincidence factors is used, a more excellent result can be obtained than using the minimum value of the coincidence factors. As described above, according to this embodiment, even if the film setting position deviates, the change of the exposure is lessened and, therefore, the difference in exposure between the similar images is also lessened with the result that a number of similar images can be reproduced with a uniform color and density. Next, a second embodiment of the present invention is described. The present embodiment applies the invention to controlling of the exposure in camera photographing. Incidentally, in this embodiment, as shown in FIG. 10A, a screen which can be viewed through a finder is divided into three regions: a central region A including a focus point (point where a cardinal object is present), a region B surrounding this central region A and a region C existing outside of region B. In this embodiment, as shown in FIG. 10B, the screen is measured for light by a photometer using six photometric elements P1 through P6. A photometer comprising a multiplicity of photometric elements and a plurality of range finders is preferably used to automatically detect the focus point so that the region A is set at the position of the focus point and the regions B and C are determined. In addition the feature value obtained from the photometric data contained within each region A, B and C, the following features B1 and B2 are adopted.

$B1 = Ba - Bbe$ $B2 = Bab - Bc$

In this case, Ba denotes the mean luminance of the region A, Bc the mean luminance of the region C, Bab the mean luminance of a region obtained by adding the regions A and Ba and Bbc and the mean luminance for a region obtained by adding the regions B and C. As the fuzzy control rule, the following five rules are used.

(1) If the feature B1 is small, then it is determined as hyperbacklight photographing.

(2) If the feature value B1 is of medium magnitude and the feature value B2 is small, then it is determined as backlight photographing.

(3) If the feature value B1 is of medium magnitude and the feature value B2 is also of medium magnitude, then it is determined as low contrast photographing.

(4) If the feature value B1 is of medium magnitude and the feature value B2 is large, then it is determined as forward light photographing.

(5) If the feature value B1 is large, then it is determined as spotlight photographing.

The language value of the above-described rule is quantified by a membership function as will be hereinafter described. That is, the membership function of the feature value B1 is determined as shown in FIG. 11A for the rule (1), FIG. 11B for the rule (2), FIG. 11C for the rule (3), FIG. 11D for the rule (4) and FIG. 11E for the rule (5). The membership function of FIG. 11A is set so that the membership value becomes 0.5 when $B1 = \alpha 1$. The membership function of FIGS. 11B to 11D is set so that when $B1 = \alpha 1$ and $B1 = \beta 1$ the membership value becomes 0.5 and the membership function of FIG. 11E is set so that when $B1 = \beta 1$ the membership value becomes 0.5. In addition, the membership function for the feature value B2 is determined as shown in FIG. 11F for the rule (2), FIG. 11G for the rule (3) and FIG. 11H for the rule (4). The members hip function of FIG. 11F is set so that, when $B2 = \alpha 2$ and $B2 = \beta 2$, the membership value becomes 0.5. The membership function of FIG. 11G is set so that when $B2 = \alpha w2$ and $B2 = \beta w2$ the membership value becomes 0.5. The membership function of FIG. 11H is set so that when $B2 = \beta 2$ the membership value becomes 0.5. These membership functions are determined by offsetting the camera relative to the regular position stepwise little by little, as described in FIG. 7, to form a histogram representing a difference between the feature value at the regular position and that at the deviated position so that when the difference equals 0 the membership value becomes 0.5. Incidentally, when the difference equals 0, the membership value may lie between 0 and 1.0. In addition, as described above, the membership function may be determined. from the distributing form of the feature values.

In addition, the final exposure is calculated by increasing the weight of the exposure evaluated in accordance with the operational formula E1 when it is determined as the hyperbacklight, by increasing the weight of the exposure evaluated in accordance with the operational formula E2 when determined as the backlight photographing, by increasing the weight of the exposure evaluated in accordance with the operational formula E3 when determined as the low contrast photographing, by increasing the weight of the exposure evaluated in accordance with the operational formula E4 when determined as the forward light photographing, and by increasing the weight of the exposure evaluated in accordance with the operational formula E5 when determined as the spotlight photographing. These operational formulas E1 to E5 each calculate the exposure using the luminances BV1 to BV5 as shown below.

$$E1: BV1 = k10 + k11 \times Babmin + k12 \times Ba + k13 \times Bbc$$

$$E2: BV2 = k20 + k21 \times Ba + k22 \times Bab + k23 \times Bc$$

$$E3: BV3 = k30 + k31 \times Ba + k32 \times Bb + k33 \times Bc$$

$$E4: BV4 = k40 + k41 \times Ba + k41 \times Bab + k51 \times Bc$$

$$E5:$$
$$BV5 = k50 + k51 \times Babmax + k51 \times Ba + k61 \times Bbc \qquad (3)$$

Incidentally, k10 to k61 denote a constant, Bb the mean luminance for the region B, Babmin the minimum luminance for a region formed by adding the regions A and B and Babmax the maximum luminance for a region formed by adding the regions A and B.

Figure 12:
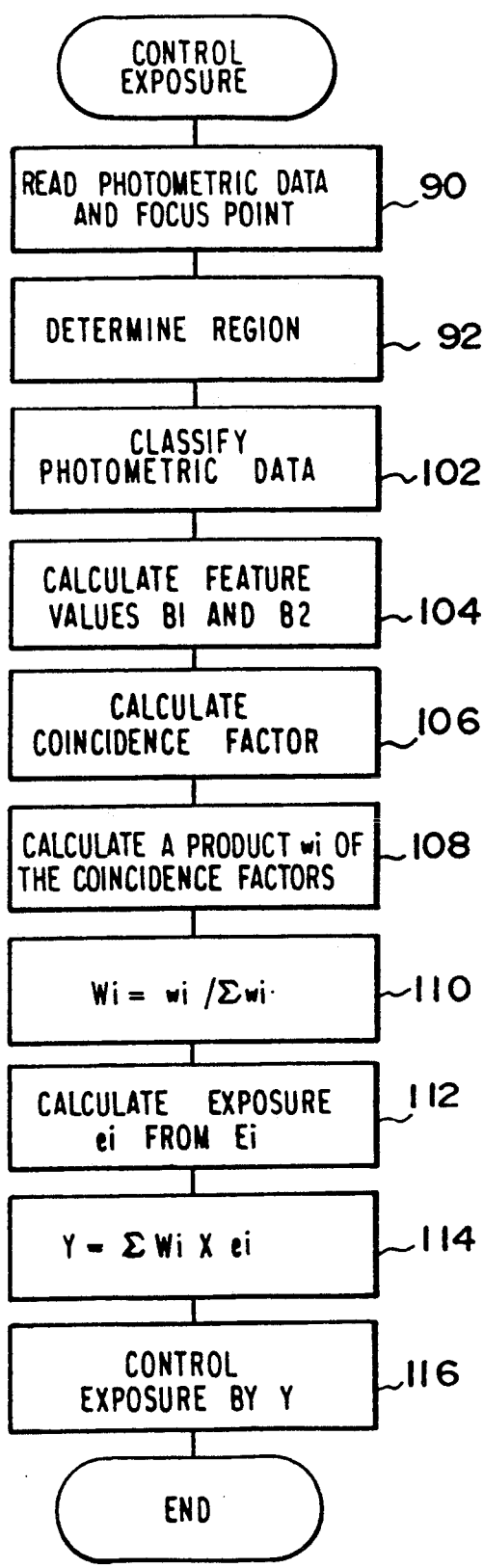
FIG. 12 is a flow chart illustrating an exposure control routine according to the second embodiment.

Next, referring to FIG. 12, an exposure control routine according to the present invention is described. Incidentally, in FIG. 12, like signs are assigned to the portions corresponding to those of FIG. 1 and a detailed description. In step 90, the photometric data and the focus point information measured by a photometer having a multiplicity of photometric elements incorporated in the camera are taken in and, in step 92, the position of the region A is determined so that the focus position lies in the center of the region A while the position of the region B is determined so that the region A lies in the central portion. Incidentally, when the range finder is provided one, since the focus point lies in the center, the regions A, B and C are fixed. In step 102, as in the first embodiment, the photometric data belonging to the region determined as above is determined to classify them and, in step 104, the feature values B1 and B2 are calculated. In step 106, the coincidence factor is calculated from the membership function shown in FIG. 11 to calculate a product of the coincidence factors and the normalized reflection factor as in the first embodiment. The exposure E1 is calculated and, as in the above-described case, the final exposure Y is evaluated to control the exposure. While conventionally the selective photometric values such as the maximum luminance or minimum luminance exercises an unstable effect on the determination of the exposure because they are selected or not selected depending on the offset position of the camera, according to the present invention, stability is increased and an appropriate exposure can also be also determined for a small cardinal object.

According to the present invention, even if the camera position is offset relative to the same objects or similar objects are photographed, a series of images of uniform density and color can be achieved.

Incidentally, although the foregoing relates to a case where the screen is divided into three regions, the present invention is not necessarily restricted thereto, but may be divided into four or more, as necessary. In addition, the membership function may also be modified, as necessary.

Next, a third embodiment, in which the second invention was applied to a color picture printing apparatus shown in FIG. 3, is described.

The fuzzy control rules according to the present embodiment are described. First, in this embodiment, the following feature values AV1, AV2, AV3 and AV4 are adopted as those obtained from the photometric data. Incidentally, these features AV1, AV2, AV3 and AV4 are evaluated for each of the colors R, G and B, but the following description ignores this distinction.

AV1: the area factor $\times$ 100 of the low density portion within the image relative to the entire screen area (incidentally, the density of the low density portion may be substituted by the density of the non-exposed portion.

AV2: mean density of the region including the mean-minimum densities of the region including the maximum density AV3: skin color density oi- the density of a highlight portion having a specific color mainly of skin color-screen mean density $$AV4: \Sigma |Di+1-Di|/N$$

where: Di and Di+1 denotes a density of an adjacent pixel Sn and N the entire number of pixels.

As the fuzzy inference rule, the following five rules (1) to (5) are used in the form of "if . . . , then . . . ".

(1) If the feature value AV1 is small and the feature value AV2 is also small, then a reflection factor of the exposure obtained by using the operational formula AF1 relative to the final exposure (value when the exposure is actually controlled), that is, the weight is increased.

(2) If the feature value AV1 is small and the feature value AV2 is large, then the reflection factor of the exposure obtained by using the operational formula AF2 relative to the final exposure is increased.

(3) If the feature value AV1 is large and the feature value AV3 is large, then the reflection factor of the exposure obtained by using the operational formula AF3 relative to the final exposure is increased.

(4) If the feature value AV1 is large and the feature AV3 is small and the feature value AV4 is small, then the reflection factor of the exposure obtained by using the operational formula AF4 relative to the final exposure is increased.

(5) If the feature value AV1 is large, the feature value AV3 is small and the feature value AV4 is large, then -the reflection factor of the exposure obtained by using the operational formula AF5 relative to the final exposure is increased. The above-described language values, "large" and "small" are quantified by the membership function for the feature value AVi (where: i=1, 2, 3, 4) including the judged value, as described above. This membership function is determined by offsetting the position of the photometric region relative to the screen stepwise in the left- and rightward directions under the assumption described with reference to FIGS. 6A to 6C and FIGS. 7A and 7B. At this time, the membership function is determined so that the membership value for the feature value AVi which corresponds to a most frequent point of the histogram, that is, the coincidence factor becomes 0.50 while at this time the feature value AVi becomes the judged value Aki. Incidentally, the membership value AVi corresponding to the most frequent point of the histogram (=judged value AKi) can be set to between 0.0 and 1.0. In addition, the feature values AVi assuming the membership values of 1.0 and 0.0 may be arranged so as to have the least frequent value of the histogram or the values closed to it, or may be arranged. to coincide with a range of frequency between the most and least frequent points. In addition, the membership function may be determined in accordance with other methods. For example, for each-scene, a film which has taken a similar object is prepared to evaluate the membership function from the fluctuation of the used feature value. Further, similar images are extracted from a great number of photographing scenes to evaluate the membership function from the variations of the feature value between the similar images.

When the membership function is determined according to the above-described method, the membership function for the feature value AVi is determined as shown in FIG. 13A for the rule (1), FIG. 13B for the rule (2), FIG. 13C for the rule (3), FIG. 13D for the rule (4) and FIG. 13E for the rule (5). In the membership fune ion for the feature AVi, the membership value is each set to 0.5 because AV1=AK1 (for example, 30, the value is 100 times as large as the density value. the same applies to the following hereinafter.), and its position is indicated by dotted line. In addition, the membership function for the feature value AV2 is determined so that the membership value becomes 0.5 with AV2-=AK2 (for example, 48), as shown in FIG. 13F for the rule (1) and FIG. 13G for the rule (1). In addition, the membership function for the feature AV3 is determined so that the membership value may becomes 0.5 with AV3=AK3 (for example, 76), as shown in FIG. 13H for the rule (3), FIG. 13I for the rule (4) and FIG. 13J for the, rule (5). Further, the membership function for the feature value AV4 is determined so that the membership value becomes 0.5 with AV4=AK4 (for example, 14), as shown in FIG. 13K for the rule (4) and FIG. 13L for the rule (5). These membership functions are intended for determining the judging condition and, as the membership value becomes greater, meaning that the coincidence factor of the feature value AVi with the judging condition becomes greater. Incidentally, the above-described operational formula AF1 is determined so that when AV1<AK1 and AV2<AK2 (pattern with a little contrasted scene at its center) an optimum exposure may be obtained, the operational formula AF2 when AV1<AK1 and AV2≧AK2 (pattern with a contrasted scene as its center), the operational formula AF3 when AV1≧AK1 and AV3≧AK3 (a pattern with a background portion of monotonous construction)(-standard scene, backlight or the like), the operational formula AF4 when AV1≧AK1, AV3<AK3 and AV-4<AK4 (a pattern with a contrasted background pattern) and the operational formula AF5 when AV1-≧AK1, AV3<AK3 and AV4≧AK4 (a pattern with a main portion in the highlight portion such as strobo-scope or night scene or the like).

The exposure operational formula AFi (i=1 to 5) is given, for example, as follows, using the feature value.

$$AFi = k0 + k1\ Dmax + k2\ Dmin + k3\ DM + k4\ DH + k5 \times S + \ldots \quad (4)$$

where: k0, k1 ... denote a constant respectively, Dmax the maximum density, Dmin the minimum density, DM an intermediate density, Dh a skin color density and S the area factor of the non-exposed portion.

The membership function determined as above is previously stored within the ROM (FIG. 3) of the exposure control circuit 40.

Incidentally, the above-described membership function may be evaluated by using the distribution of the feature value evaluated by repeatedly photometrically measuring the image by changing the region and the condition over a predetermined range of the histogram illustrating the distribution of the feature value AVi.

Next, an exposure control routine according to the present invention for controlling the exposure using the above-described membership function is described with reference to FIG. 14. Since this routine corresponds to the routine of FIG. 1, the same signs are assigned to the corresponding portion to aid in description. In step 100, the photometric data detected by the sensor 28 is read and, in step 104, using the above-described data, the above-described feature values AV1 to AV4 are calculated. In the step 106, in accordance with the above-described inference rules (1) to (5), coincidence factors corresponding to the feature values AV1 to AV4 are calculated from the membership function shown in FIG. 13. That is, the coincidence factor with the judging condition is calculated for the feature values AV1 to AV 4 and, in step 108, a product awi of the coincidence factors, that is, the coincidence factor for each of the five patterns is calculated for each of the rules (1) to (5). Since the coincidence factor for this pattern represents the reflection factor of the exposure evaluated from each operational formula relative to the final exposure, it is hereinafter described in terms of the reflection factor. In the example shown in FIG. 13, since for the rule (1), the coincidence factor for the feature value AVi, that is, the membership value is 0.7 (indicated by solid line. The same applies to the following hereinafter.) and the coincidence factor for the future value AV2 is 0.4, the reflection factor becomes 0.7×0.4=0.28. For the rule (2), since the coincidence factor for the feature value AV1 is 0.7 and the coincidence factor for the feature value AV2 is 0.6, the reflection factor aw2 becomes 0.7×0.6=0.42. For the rule (3), since the coincidence factor for the feature value AVI is 0.3 and the coincidence factor for the feature value AV3 is 0, the reflection factor aw3 becomes 0.3×0=0. For the rule (4), since the coincidence factor for the feature value AV1 is 0.3, the coincidence factor for the feature value AV3 1.0 and the coincidence factor for the feature value AV4 is 0.9, the reflection factor aw4 becomes 0.3×1.0×0.9=0.27. In addition, for the rule (5), since the coincidence factor for the feature value AV1 is 0.3 and the coincidence factor for the feature value AV3 is 1.0 and the coincidence factor for the feature value AV4 is 0.1, the reflection factor aw5 becomes 0.3×1.0×0.1=0.03.

In the next step 110, the reflection factor is normalized in accordance with the following formula.

$$AWi = awi / \sum_{i=1}^{5} awi \quad (5)$$

By this normalization, $$\sum_{i=1}^{5} AWi = 1.0$$

In the next step 112, the exposure afi is calculated in accordance with the exposure operational formula AFi (where: i=1,2 ... 5) and, in step 114, a weight corresponding to the normalized reflection factor AWi is applied to each of the exposures afi, and the value integrated in accordance with the formula (6) is evaluated as the final exposure X.

$$X = \sum_{i=1}^{5} AWi \times afi \qquad (6)$$

In addition, the driver 30 is triggered by an exposure control value determined by this final exposure X to control the position of the dimmer filter 60 to control the exposure.

Although, in the foregoing, an example in which the reflection factor is evaluated calculating the product of the coincidence factors was described, as will be described below, a fuzzy theory by logical AND may be used with the minimum value of the coincidence factors as the reflection factor. That is, in an example of FIG. 15 using the same membership function as in FIG. 13, since, for the rule (1), the coincidence factor with the feature value AV1, that is, the membership value is 0.7 and the coincidence factor with the feature value AV2 is 0.4, the reflection factor is set to 0.4, which is the minimum value of 0.7 and 0.4. For the rule (2), since the coincidence factor for the feature value AV1 is 0.7 the reflection factor aw2 is set to 0.7 and the coincidence factor for the feature value AV2 is 0.6, which is the minimum value of 0.7 and 0.6. For the rule (3), since the coincidence factor with the feature value AV1 is 0.3 and the coincidence factor for the feature value AV3 is 1.0 and the coincidence factor with the feature value AV4 is 0, the reflection factor aw3 is set to 0, which is the minimum value of 0.3 and 0. For the rule (4), since the coincidence factor with the feature value V1 is 0.3 and the coincidence factor with the feature value AV3 is 1.0 and the coincidence factor with the feature value AV4 is 0.9, the reflection factor aw4 is set to 0.3, which is the minimum value of 0.3, 1.0 and 0.9. In addition, for the rule (5), since the coincidence factor with the feature value AV1 is 0.3 and the coincidence factor with the feature value AV3 is 1.0 and the coincidence factor with the feature value AV4 is 0.1, the reflection factor aw5 is set to 0.1, which is the minimum value of 0.3, 1.0 and 0.1.

When the exposure was controlled as described above, using the same original images, the variations of the exposure according to the present invention (based on the fuzzy theories by algebraic product and by logical AND, which is caused by the deviation of the film setting positions, were found. to be similar to those of FIG. 9. it proved that according to the fuzzy theories by algebraic product and by logical AND, even if the film setting positions deviated, the change of the exposure was small. In addition, according to the fuzzy theory by algebraic product in the present invention, the change of the exposure relative to the deviation of the film setting position is smaller than in the fuzzy theory by logical AND, and when the product of the coincidence factors is used, a more excellent result can be obtained than when the minimum value of the coincidence factors is used.

Usually, when the patterns are classified in determining the exposure, the range of the image included into a single pattern is ambiguous. In addition, most patterns not only belong to a single pattern, but also have elements of other patterns. As in the conventional cases, it is not advisable to apply a single image only to a single pattern. In such a case, it is extremely expedient and effective to apply fuzzy reasoning to such a problem.

As described above, according to this embodiment, even if the film setting position is offset, the change of the exposure is small, and therefore, the difference of the exposure between the similar images becomes small with the result that a series of similar images are reproduced with uniform color and density.

Next, a fourth embodiment is described. This embodiment is an application of a color copying machine see (Japanese Patent Laid-Open No. 63-187139) for discriminating between the color picture copy and the color print copy to control the exposure. The color copy, may concist of a mix of copy pictures and color prints, a mix of the characters and the color image, one using various color materials such as an illustration or the like. In such a case, it is insufficient to only classify the copies into color picture copies and color print copy. This embodiment intends to achieve a copies closer to the original image.

Figure 17:
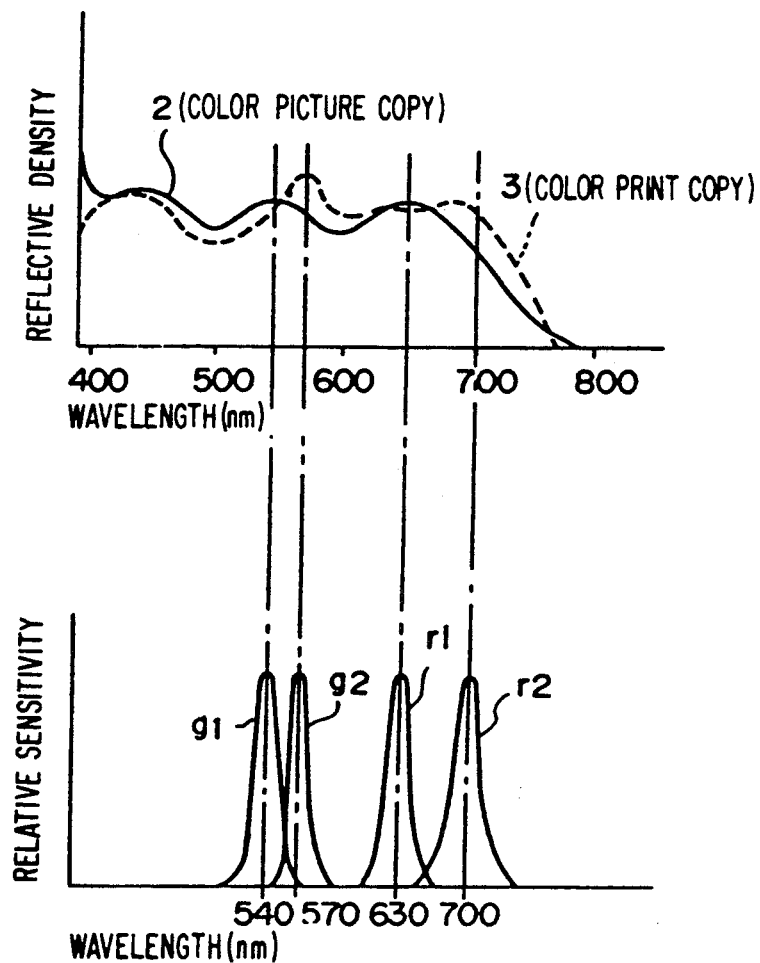
FIG. 17 is a diagrammatic view illustrating a relative sensitivity between the reflection density of a copy and a sensor.

FIG. 17 illustrates a spectral reflection density for the color picture and color print, on which images of medium and high density are recorded, and having a uniform color distribution. A density curve 2 indicated by solid line is a density distribution of the color picture. A density curve 3 indicated by dotted line is the density distribution of a color print having a peak reflection density within a range of wavelengths corresponding to green.

A magenta pigment used for the color picture has a maximum density (maximum absorption wavelength) within a range of 530 to 560 nm and a cyan pigment around a range of 650 nm. Yet the magenta pigment and the cyan pigment each have a characteristic in which the density (absorption factor) is rapidly reduced with the maximum absorption wavelength as its center. Meanwhile, magenta ink used for the color print has a maximum density of around 570 nm. In addition, cyan ink has an approximately flat density of up to 600 to 700 nm, and for the range of a wavelength longer than 700 nm, a more rapid reduction of the density can be seen than for the cyan pigment of the color picture.

As described above, since a color material of different characteristic is used depending on the kind of color copy, the reflected light may be measured using two kinds of sensors each having a sensitivity peak for the different wavelengths of the same range to compare two resulting measured values, for example, a spectral reflection density or spectral intensity to discriminate the kind of color copy. In FIG. 17, a curve g1 represents a sensitivity curve of a first sensor for the green color for measuring the green light of the three primary colors, having a sensitivity peak within the wavelengths of 540±15 nm. A curve g2 represents a sensitivity curve of a second sensor for the green color for measuring the green light of the three primary colors, having a sensitivity peak within the wavelengths of 570±15 nm. A curve r1 represents a sensitivity curve of a first sensor for the red color for measuring the red color of the three primary colors, having a sensitivity peak within the wavelengths of 630±40 nm. A curve r2 represents a sensitivity curve of a second sensor for the red color for measuring the red color of the three primary colors, having a sensitivity within the wavelengths 680±40 nm. In particular, when the sensitivity peak of the wavelength r1 lies within the range of 650±20 nm, the wavelength r2 preferably has the sensitivity peak within 700±20 nm while, when the sensitivity peak of the wavelength r1 lies within the range of 610±20 nm, the wavelength r2 preferably has the sensitivity peak within 660±20 nm.

Figure 18:
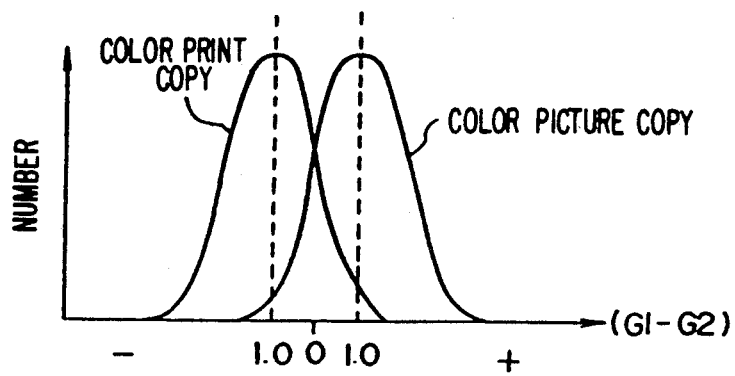
FIG. 18 is a histogram illustrating a difference in the green densities.

When a histogram of the difference (G1−G2) of the green color densities detected by two kinds of green sensors, as shown in FIG. 18, is generated since the peak posit are different between the color picture copy and the color print copy, by discriminating these peak values, both copies can be discriminated. Incidentally, a substantially similar histogram results also for the difference (R1−R2) of the red color densities.

Therefore, in this embodiment, the next feature values N1 to N4 are adopted.

N1: the number of the measuring points which satisfy a condition: G1−G2<0.10

N2: the number of the measuring point which satisfy a condition: G1−G2>0.10

N3: the red color density measured by the first red color sensor

N4: the number of measuring points which satisfy a condition: R1−R2>0.10

In addition, as the fuzzy control rules, the following rules (1) to (5) are used.

(1) If the feature value N1 is large, then the reflection factor of the exposure obtained by using the exposure condition HI for the color print copy relative to the final exposure.

(2) If the feature N1 is small and the feature value N2 is large, then the reflection factor of the exposure obtained by using the exposure condition H2 for the color picture copy relative to the final exposure is increased.

(3) If the feature value N1 is small, the feature value N2 is small, the feature value N3 is large and the feature value N4 is small, then the reflection factor of the exposure obtained by using the exposure condition H1 relative to the final exposure is increased.

(4) If the feature value N1 is small, the feature value N2 is small, the feature value N3 is large and the feature value N4 is large, then the reflection factor of the exposure obtained by using the exposure condition H2 relative to the final exposure is increased.

(5) If the feature value N1 is small, the feature value N2 is small and the feature value N3 is small, then the reflection factor of the exposure obtained by using the exposure condition H3 for the intermediate copy relative to the final exposure is increased.

The above-described exposure condition is a parameter or exposure operational formula for determining a predetermined exposure. The above-described values "large" and "small" are quantified by a membership function including the judging value shown in FIG. 16. The membership function for the feature value N1 is determined as shown in FIG. 16A for the rule (1), FIG. 16B for the rule (2), FIG. 16C for the rule (3), FIG. 16D for the rule (4) and. FIG. 16E for the rule (5), so that when N1=K, the membership value becomes 0.5. In addition, the membership function for the feature value N2 is determined as shown in FIG. 16F for the rule (2), FIG. 16G for the rule (3), FIG. 16H for the rule (4) and FIG. 16I for the rule (5) so that when N2=K', the membership value becomes 0.5. The membership function is determined as shown in FIG. 16J for the rule (3), FIG. 16K for the rule (4), FIG. 16L for the rule (5), so that when N3=0.4, the membership value becomes 0.5. In addition, the membership function for the feature value N4 is determined as shown in FIG. 16M for the rule (3) and FIG. 16N for the rule (4), so that when N4=K", the membership value becomes 0.5.

The present invention may be applied to Japanese Patent Application Laid-Open No. 63-187139. Four sensors are disposed at the portion of the copying machine for measuring the copy density for the photometric purpose and, from the resulting photometric data, as in the above-described embodiment, the feature values N1 to N4 are calculated and in accordance with the fuzzy inference rules (1) to (5), the coincidence factors (values indicated by solid line) for the feature values N1 to N4 are calculated from the membership function shown in FIG. 16 to calculate an algebraic product (or logical AND) of the coincidence factors for each of the rules (1) to (5) to obtain the reflection factor w1a for the rule (1), reflection factor w2a for the rule (2), reflection factor w1b for the rule (3), reflection factor w2b for the rule (4) and the reflection factor w3 for the rule (5). In addition, the reflection factor w1a and the reflection factor w1b are added to calculate a reflection factor w1 for the exposure condition HI while the reflection factor w2a and the reflection factor w2b are added to calculate a reflection factor w2, for the exposure condition H2 and a reflection factor w3 is determined as one for the exposure condition H3.

Then, as in the foregoing, a normalizing operation is performed. With the normalizing reflection factors w1, w2 and w3 as the weight, the exposures are each calculated from the exposure conditions H1, H2 and H3 so that their weighted mean is determined as the final exposure.

Next, a fifth embodiment is described. In this embodiment, a plurality of color regions are assumed on the color coordinate and it is determined to which color region the photometric data belongs to classify the photometric data. The photometric data for each region is selected according to the amount of the photometric data for a specific color region or the maximum density of the specific color region, and based on the selected photometric data, the exposure is controlled. At that time, the second invention is applied.

Figure 19:
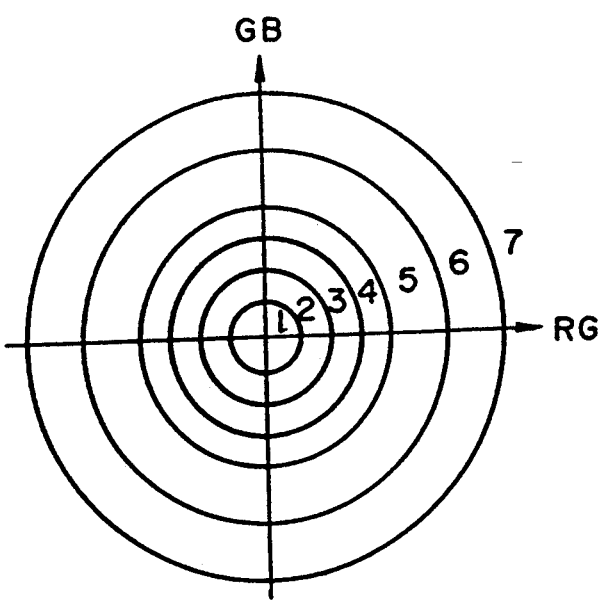
FIG. 19 is a diagrammatic view illustrating a color region according to a fifth embodiment.

As illustrated in FIG. 19, the color regions for the present embodiment are defined by concentric circles with the origin as its center on a two dimensional color coordinate, which uses a RG (=R (red)−G (green)) as the horizontal axis and a GB (=G−B (blue)) axis as the vertical axis. A region I including the origin is a region for the neutral color and the remaining region is a region where saturation is increased as it is located farther from the origin.

In this embodiment, the following four feature values AREA1 to AREA4 are adopted.

AREA 1: the maximum density of the color region I or the number of the measuring points included within the color region 1.

AREA 2: the maximum density of the color region 2 or the number of the measuring points included within the color region 2

AREA 3: the maximum density of the color region 3 or the number of the measuring points included within the color region 3

AREA 4: the maximum density of the color regions 4 to 7 or the number of the measuring points included within the color regions 4 to 7

In addition, as the fuzzy inference rules, the following four rules are used.

(1) If the feature value AREA 1 is large, then the reflection factor of the exposure obtained by using the exposure operational formula F1 relative to the final exposure is increased.

(2) If the feature value AREA1 is small and the feature value AREA 2 is large, then the reflection factor of the exposure obtained by using the exposure operational formula F2 relative to the final exposure is increased.

(3) If the feature value AREA 1 is small, the feature value AREA 2 is small and the feature value AREA 3 is large, then the reflection factor of the exposure obtained by using the exposure operational formula F3 relative to the final exposure is increased.

Figure 20:
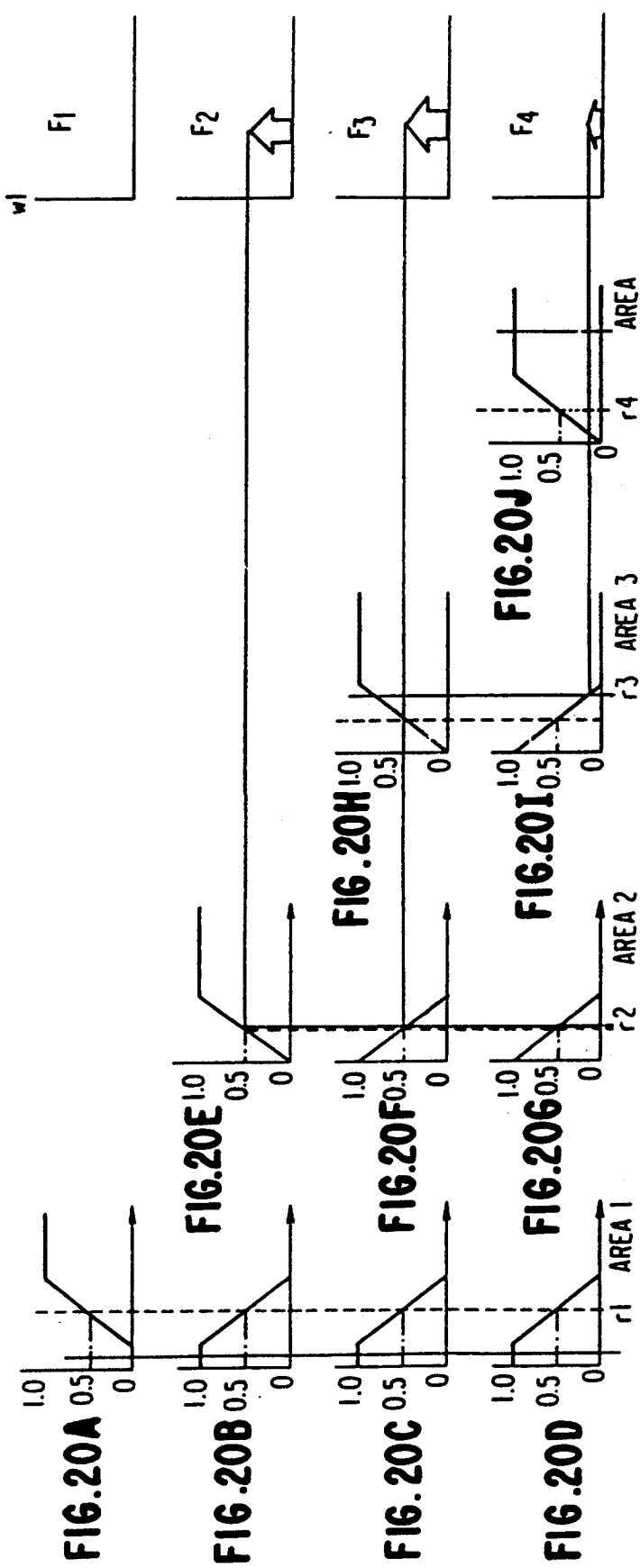
FIGS. 20A and 20J are respectively a diagrammatic view illustrating a membership function and the like according to a fifth embodiment.

(4) If the feature value AREA1 is small, the feature value AREA2 is small and the feature value AREA3 is small and the feature value AREA4 is large, then the reflection factor of the exposure obtained by using the exposure operational formula F4 relative to the final exposure is increased. In addition, the above-described values, "large" and "small", are quantified by a membership function including the judging value shown in FIG. 20. The membership function for the feature value AREA1 is determined as shown in FIG. 20A for the rule (1), FIG. 20B for the rule (2), FIG. 20C for the rule (3) and FIG. 20D for the rule (4), so that when AREA1=γ1, the membership value becomes 0.5. The membership function for the feature value AREA2 is determined as shown in FIG. 20E for the rule (2), FIG. 20F for the rule (3) and FIG. 20G for the rule (4), s that when AREA2=γ2, the membership value becomes 0.5. In addition, the membership function for the feature value AREA3 is determined as shown in FIG. 20H for the rule (3), FIG. 20I for the rule (4) and FIG. 20I , for the rule (4), so that when AREA3=γ3, the membership value becomes 0.5. The membership function for the feature value AREA4, as shown in FIG. 20J, is determined so that when AREA4=γ4, the membership value becomes 0.5.

In addition, according to the above-described operational formulae F1 to F4, the exposure is calculated using the photometric data defined as below.

$$F1 = 10 \times DA1 + 10 \times DA2 + 6 \times DA3$$

$$F2 = 10 \times DA2 + 10 \times DA3 + 6 \times DA4$$

$$F3 = 10 \times DA3 + 10 \times DA4 + 3 \times DA5 + 3 \times DA6$$

$$F4 = 10 \times DA4 + 10 \times DA5 + 10 \times DA6 + 10 \times DA7 \tag{7}$$

Hereinabove, DA1, DA2, ... DA7 denote the photometric data for the region 1, region 2 ... and region 7 of FIG. 19 respectively.

In this embodiment, frame images are photometrically measured by the sensor 28 of FIG. 3 and it is determined which of the color regions of FIG. 19 belongs for classification. Then, from the classified data, the feature values AREAI to AREA4 are calculated, and the coincidence factors (shown in the embodiment) for AREA I to AREA4 is calculated from the membership function shown in FIG. 20, in accordance with the fuzzy inference rules (1) to (4). Logical AND (or algebraic product) is calculated for each of the rules (1) to (4) to evaluate the reflection factors w1 to w4. Then, as in the above-described formula (2), a normalization is performed to obtain a final exposure, which is a weighted mean of the exposures evaluated from the exposure operational formulas F1 to F4, with the normalized reflection factors as the weight.

Incidentally, the following formula may be used as the exposure operational formula Fi (i=1, 2, ... 4) for the present embodiment.

$$Fi = Kij \times (\Sigma Nij \times DAij)/\Sigma Nij \tag{8}$$

where: j denotes the number of the color regions and Nij the number of the photometric points in each color region involved with the exposure control.

In addition, the final exposure XX may be defined as shown in the following formula (9) or (10).

$$XX = K \times X + (1.0 - K) \times Z \tag{9}$$

where: $X = \Sigma(Wi \times FI)/\Sigma Wi$, Z denotes the mean density of a multiplicity of frames or a reference density and K a coefficient defined by the maximum Wi, in which the more i is the closer it is to 1.

$$XX = \Sigma(Wi \times (Ki \times Fi + (1.0 - Ki \times Z))/\Sigma Wi \tag{10}$$

where: Ki is a coefficient defined for Fi, which becomes closer to 1 the larger i becomes.

According to this embodiment, as compared with the conventional ones, color fluctuation for each image is small and a highly reproducible exposure is achieved.

Incidentally, in each of the above-described embodiments, prior to evaluating the coincidence factor for the pattern that is, the reflection factor, the coincidence factor for the feature value may be changed as follows using a single or a plurality of functions. That is, (1) Smaller coincidence factors wi are regarded as 0 to reduce the number of the operational formulas or the contribution of the larger coincidence factors wi to the operational formula is emphasized, or as desired, the contribution factor is altered. (2) A plurality of functions for changing the coincidence factor are prepared and, as desired or according to the desired magnitude of the output, the function is selected to alter the coincidence factor. In this case, the function may be selected for each frame or may be set in common to all frames or may be automatically selected.

In addition, although in the above-described embodiment, an example using all patterns was described, an appropriate number of patterns may be used starting from those with a larger coincidence factor. The present invention is effective for implementing methods of determining an exposure based on the classified categories of the image and comprising steps of comparing the image feature value with a predetermined value, as used in the copying machine, printer, printing scanner or the like, and those methods fall within the scope of the present invention.

Next, a sixth embodiment when the third aspect of the invention is applied to the color picture printing apparatus of FIG. 3 is hereinafter described.

A fuzzy inference rule according to the present embodiment is described. First, in this embodiment, a plurality of color regions are assumed on the color coordinate and it is determined in which color region the photometric data belongs to classify the photometric data. The photometric data for each region is selected according to the amount of the photometric data for a specific color region or the feature values such as the mean density or the like of the specific color region or the like and, in accordance with the selected photometric data, the exposure is controlled. At that time, the third aspect of the invention is applied.

Figure 21:
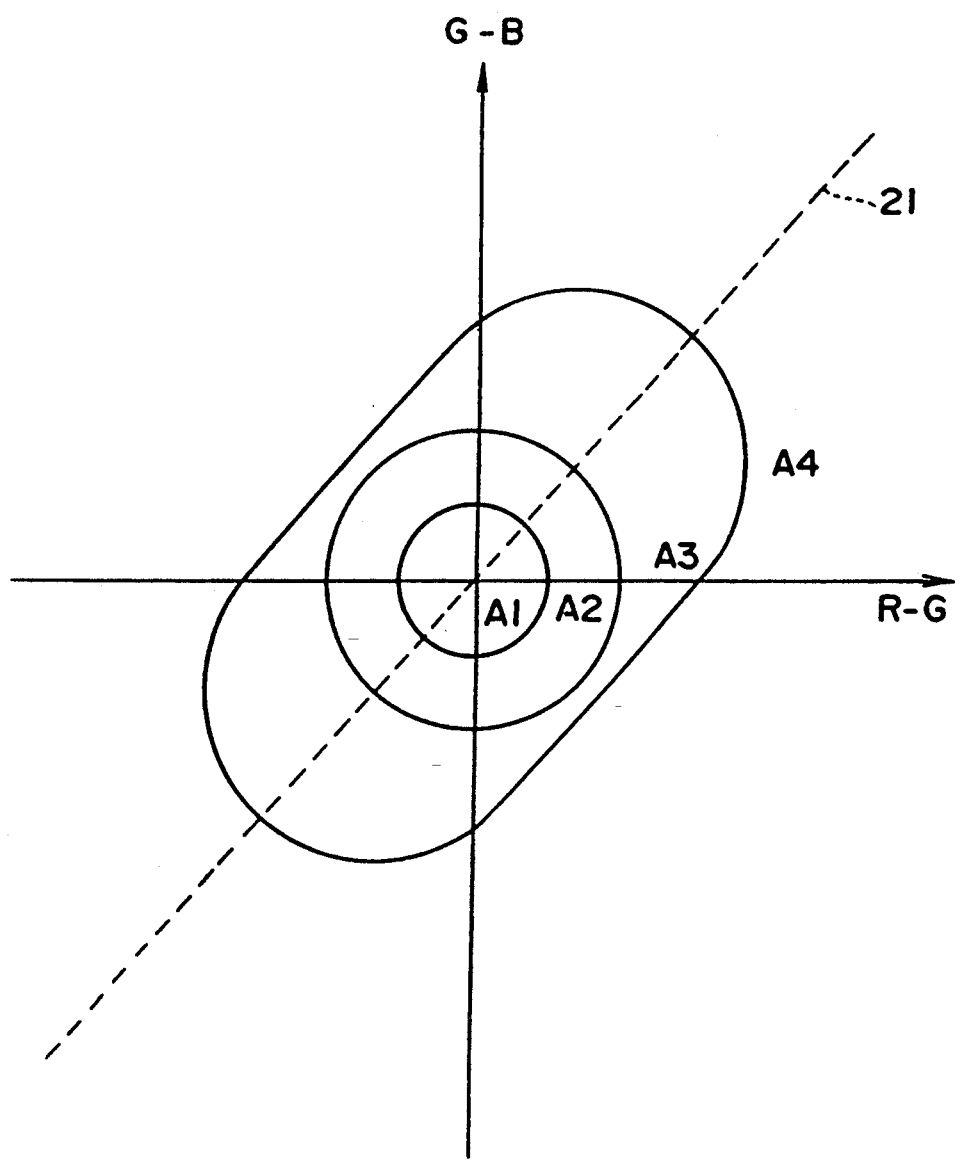
FIG. 21 is a diagrammatic view illustrating a color region according to a sixth embodiment of the present invention.

The color regions according to this embodiment are in concentric circles and eclipses with the origin, that is, the gray color as their center, on a two-dimensional color coordinate, which uses the RG (=R (red)−G (green)) axis shown in FIG. 21 as the horizontal axis and the GB (=G−B (blue)) axis as the vertical axis. The region A1 including the origin is a gray region and the region A2 is a color, region close to the gray color. The region A3 is a color region of medium saturation having a wide region relative to the axis along which changes of the colortemperature are plotted, and the region A4 is a color region of high saturation.

According to the present invention, the following four feature values D1 to D4 are adopted.

D1: the value corresponding to the mean density or the intermediate density of the color region A1 or the number of photometric points included within the color region A1

D2: the value corresponding to the mean density or the intermediate density of the color region A2 or the number of photometric points included within the color region A2

D3: the value corresponding to the mean density or the intermediate density of the color region A3 or the number of photometric points included within the color region A3

D4: the value corresponding to the mean density or the intermediate density of the color region A4 or the number of photometric points included within the color region A4

As the fuzzy inference rules, the following four rules (1) to (4) are used taking the form of a statement "if . . . then . . .".

(1) If the feature value D1 is large, then the reflection factor of the exposure obtained by using an exposure operational formula BF1 relative to the final exposure (the value whereby the exposure is actually controlled) is increased.

(2) If the feature value D1 is small and the feature value D2 is large, then the reflection factor of the exposure obtained by using an exposure operational formula BF2 relative to the final exposure is increased.

(3) If the feature value D1 is small, the feature value D2 is small and the feature value D3 is also small, then the reflection factor of the exposure obtained by using an exposure operational formula BF3 relative to the final exposure is increased.

(4) If the feature value D1 is small, the feature value D2 is small and the feature value D3 is large, then the reflection factor of the exposure obtained by using an exposure operational formula BF4 relative to the final exposure is increased.

Figure 22:
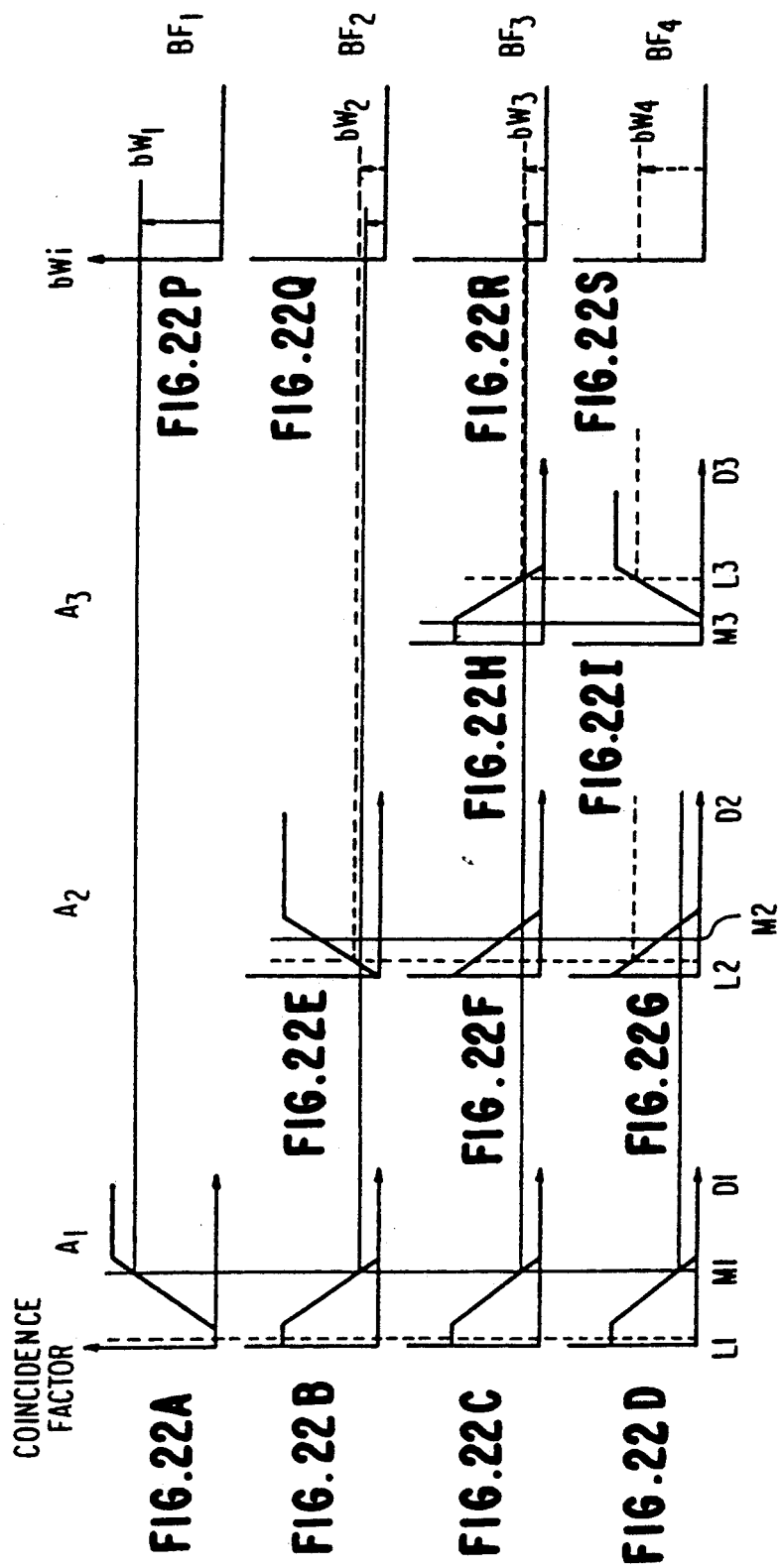
FIGS. 22A through 22I and 22P through 22S are respectively a diagrammatic view illustrating a membership function and the like according to the sixth embodiment of the present invention.

In addition, the above-described values, "large" and "small", are quantified by a membership function shown in FIG. 22. The membership function for the feature value D1 is determined as shown in FIG. 22A for the rule (1), FIG. 22B for the rule (2), FIG. 22C for the rule (3) and FIG. 22D for the rule (4).

The membership for the feature value D2 is determined as shown in FIG. 22E for the rule (2), FIG. 22F for the rule (3) and FIG. 22G for the rule (4). In addition, the membership function for the feature value D3 is determined as shown in FIG. 22H for the rule (3) and FIG. 22I for the rule (4).

In addition, the above-described exposure operational formula BFi (i=1 to 4), as shown below, is determined so as to calculate the exposure using the photometric data for the predetermined region.

$$BFi = ki1 \times D1 + ki2 \times D2 + ki3 \times D3 + ki4 \times D4 + ki0$$

where: $kij$ (i=1 to 4 and j=1 to 4) denotes a coefficient and $ki0$ a constant including 0.

If i=1, then k13=k14=0 and k11 22 k12.
If i=2, then k24=0 and k21>k22≈k23.
If i=3, then k34≈k31<k32≈k33.
If i=4, then k41=0 and k42≈k43<k44.

D1, D2, D3 and D4 each denote photometric data for the regions $A1m$ $A2$, $A3$ and $A4$ respectively.

The membership functions and the exposure operational formulas defined as above are stored in advance within the ROM of the exposure control circuit 40.

Figure 23:
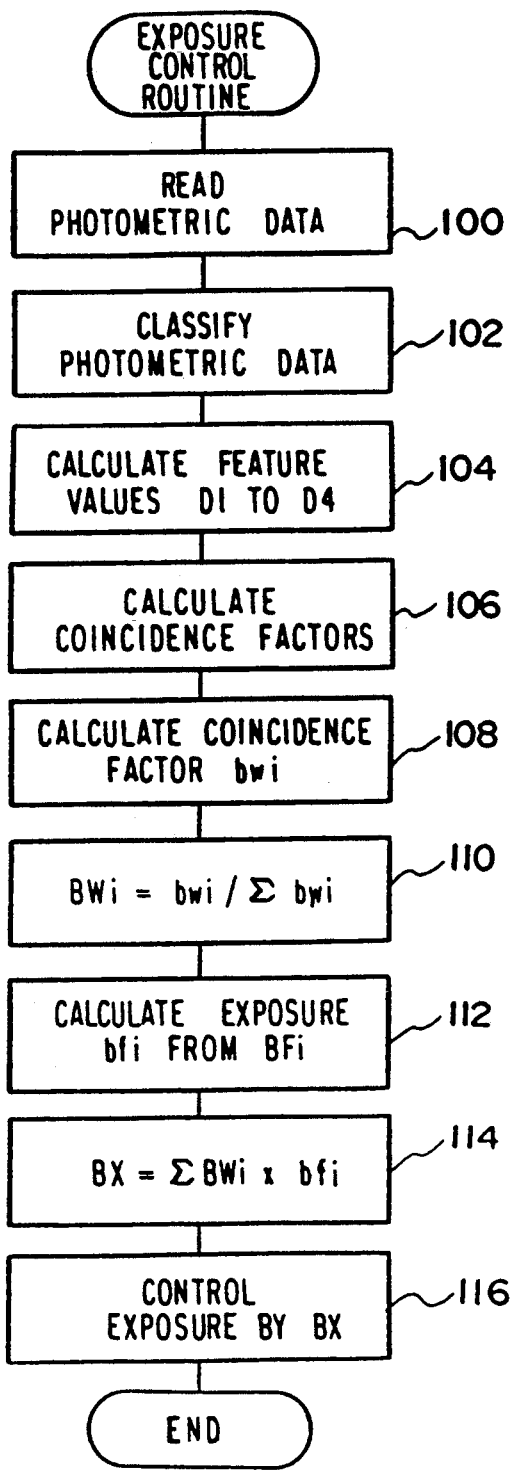
FIG. 23 is flow diagram illustrating an exposure control routine according to the sixth embodiment of the present invention.

Next, referring, to FIG. 23, an exposure control routine according to the present invention using the above-described membership functions is described. Incidentally, since FIG. 23 corresponds to FIG. 1, like signs are each applied to the corresponding portions for ease of description. In step 100, the photometric data detected by the sensor 28 is read and in step 104, using the data, the above-described features D1 to D4 are calculated. In the next step 106, in accordance with the above-described fuzzy inference rules (1) to (4), the coincidence factors each corresponding to the feature values D1 to D4 are calculated from the membership functions shown in FIG. 22, that is, the coincidence factor with the judging condition is calculated for each of the feature values D1 to D4. In step 108, a logical AND of the coincidence factors, that is, the minimum value $bwi$ of the coincidence factors or a coincidence factor for each of the above-described four color regions, is calculated for each of the rules (1) to (4). This coincidence factor for the color region is described below as the reflection factor because it represents the reflection factor of the exposure evaluated from each exposure operational formula for the final exposure.

In the example shown in FIG. 22, the coincidence factor for the feature value D1 is the same as the membership value for the rule (1). Therefore, this membership value is taken as the reflection factor $bw1$. For the rule (2), the minimum value of the coincidence factors for the feature values D1 and D2 is used and this minimum value is taken as the reflection factor $bw2$. For the rule (3), the minimum value of the coincidence factors for the features D1, D2 and D3 respectively is used for the reflection factor $bw4$. For the rule (4), the minimum value of the coincidence factors for the feature D1, D2 and D3 is respectively used for the reflection factor $w4$.

In the next step 110, normalization of the reflection factors is performed in accordance with the following formula.

$$BWi = bwi / \sum_{i=1}^{4} wbwi \qquad (11)$$

By so doing, $$\sum_{i=1}^{4} BWi = 1.0.$$

In the next step 112, the exposure bfi is calculated in accordance with the exposure operational formula BFi (where: i=1, 2 ... 4) and, in step 114, a weight corresponding to the normalized reflection factor BWi is applied to each of the exposure bfi to obtain a value integrated as shown in the following formula which is the final exposure BX.

$$BX = \sum_{i=1}^{4} BWi \times bfi \quad (12)$$

The driver 30 is triggered by an exposure control value determined by this final exposure BX to control the position of the dimmer filter 60 to control the exposure.

The above-described matters are further described for an average object and an object film under a different kind of light source with reference to FIG. 22. The feature values, the data resulting from the average object, are each M1, M2 and M3 and the feature values for the object under the different kind of light source are each L1, L2 and L3. The reflection factor bwi is evaluated in accordance with each fuzzy rule to obtain a normalized reflection factor BWi. This normalized reflection factor BWi is indicated by solid line for the average object and by broken line for the object under the different kinds of light sources in FIG. 22, (P) to (S). For the average object, the normalized reflection factor BWi is greater for the rule (1). For the object under different kinds of light sources, the normalized reflection factor BW1 is greater for the rule (4). As a result, for the average object, the weight of the BF1 formula is great and the exposure is controlled in accordance with the feature value exhibited by the A1 region to prevent color failure while, for the object under the different kind of light source, the weight of the BF4 formula is great and the exposure is controlled in accordance with the feature value exhibited by the A4 region to correct the exposure by the different kinds of light sources.

Although, in the foregoing, description was made as to the fuzzy theory by logical AND with the minimum value of the coincidence factors, a fuzzy theory by algebraic product, in which a product of the coincidence factors is calculated to evaluate the reflection factor, may be used. That is, for the rule (1), the coincidence factor for the feature value D1, that is, the membership value, becomes the reflection factor bw1. For the rule (2), a product of the coincidence factor for the feature factor D1 and the coincidence factor for the feature value D2 becomes the reflection factor bw2. Similarly, for the rules (3) and (4), the reflection factors bw3 and bw4 can be evaluated by evaluating a product of the coincidence factors according to the rules. In addition, any synthesizing rule of other fuzzy theories, in which the reflection factor may be evaluated from the coincidence factor, may be used.

As described above, according to this embodiment, even if the film setting position is offset, a change of the exposure, which will be caused by the resulting fluctuation of the photometric condition, is small and, therefore, the difference of the exposures between the similar images becomes small, so that a series of similar images is reproduced with uniform colors.

Incidentally, as the exposure operational formula BFi (i=1, 2, 3 and 4) for this embodiment, the following formula may be used.

$$BFi = \{\Sigma w \, (kij \times DAij)\} / \{\Sigma (kij \times Nij)\} \quad (13)$$

where: j denotes the number of the color region, DAij a value obtained by adding the photometric values for the region Ai (or integrated value) and Nij the number of the photometric points for each color region involved with the exposure control.

In the exposure operational formula BFi for the present invention (i=1, 2, 3 and 4) a certain value exhibited according to the kind of the film may be added as D5, or a certain value which does not depend on the kind of film may be added thereto as BF5.

In addition, in this embodiment, the mean density may be further classified into the high and low or the color for the high density portion may be used, so that some fuzzy inference rules may be added for discriminating daylight, artificial light and dawn or the like.

Incidentally, in the above-described embodiment, prior to evaluating the coincidence factor for the color region, that is, the reflection factor, a single or a plurality of coincidence factors for the feature value may be used to change as follows. That is, (1) the smaller coincidence factors bwi are regarded as 0 to reduce the number of the operational formulae, or the contribution of the greater coincidence factors bwi to the operational formula is emphasized. Otherwise, the contribution factor is changed as desired. (2) A plurality of functions for changing the coincidence factor is prepared and the function is selected as desired or depending on the desired magnitude of the output to alter the coincidence factor.

Figure 24A:
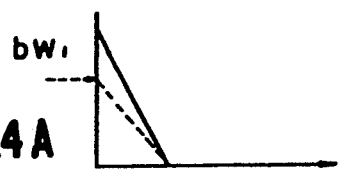
FIGS. 24A through 24E are respectively a diagrammatic view illustrating a membership function and the like according to the sixth embodiment of the present invention.
Figure 24B:
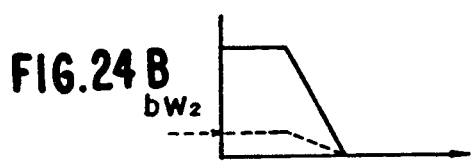
Figure 24C:
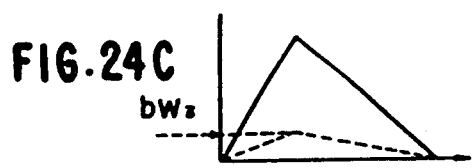
Figure 24D:
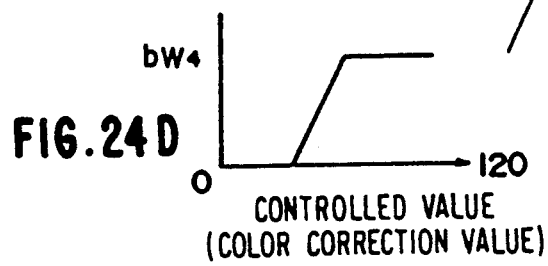
Figure 24E:
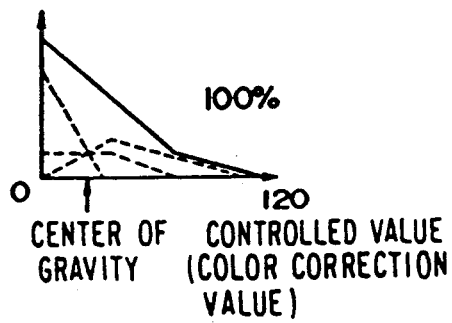

According to the above-described fuzzy theory by logical AND in the present invention, it is known that the value of the coincidence factor or the value of the gravitational center according to the center-of-gravity system can be smoothly changed. For example, as shown in FIG. 24, the results of inference for each rule of fuzzy inference each result in the solid line, as shown in FIGS. 24A, 24B, 24C and 24D. Here, if the above-described algebraic product is used, then a fuzzy set results in a membership compressed so that the peak of the maximum value coincides with the coincidence factor bwi, as indicated by solid line. When the membership functions of FIGS. 24A, 24B, 24C and 24D are synthesized, FIG. 24E is obtained as a result of inference of the entire rule. In accordance with the center-of-gravity system, the value of its gravitational center may be defined as the established value to make it correspond to the control value. Here, the feature value may be made to correspond to a color correction value while the gravitational value evaluated by the center-of-gravity system may be taken as the established value so that the exposure is controlled by the color correction value of this established value, or the value of the gravitational center, which is evaluated by making the feature value correspond to the value of the photometric data representing the classified color region, may be taken as the weight coefficient for the photometric data to control the exposure.

Figure 25:
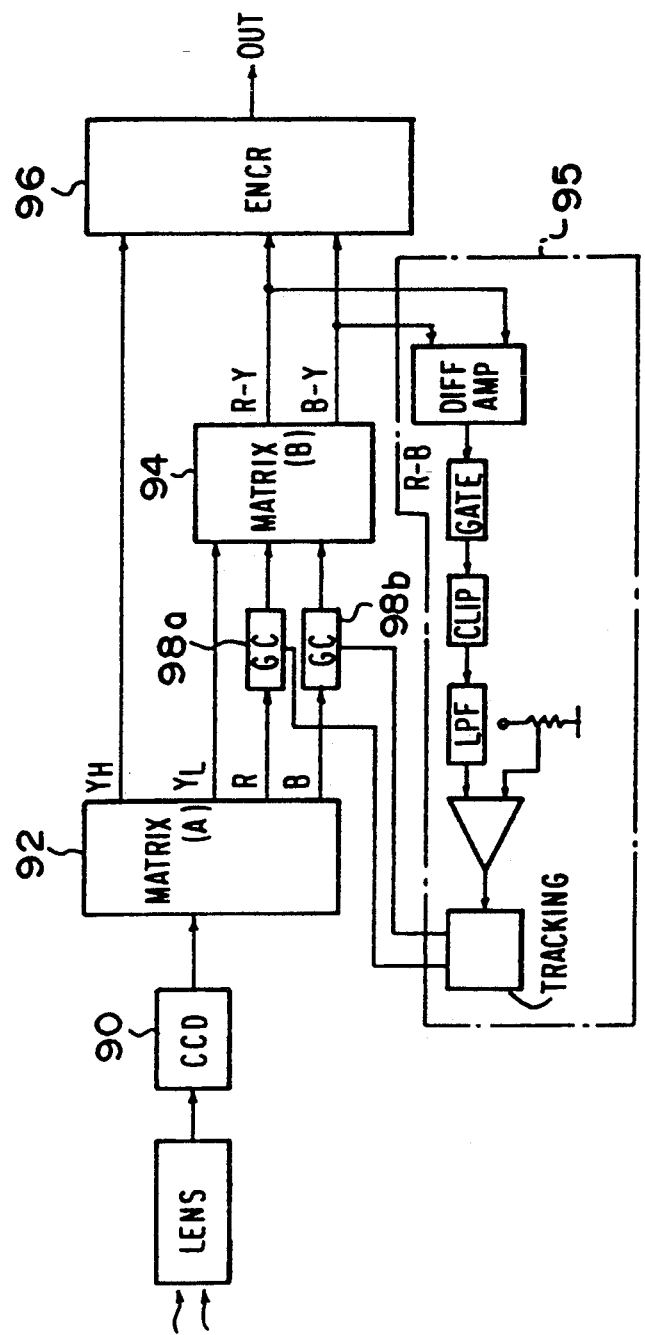
FIG. 25 is a block diagram of a video camera apparatus according to a seventh embodiment of the present invention.

Next, a seventh embodiment is described. This embodiment is achieved by applying the third invention to the video camera apparatus, and FIG. 25 illustrates a block diagram of a video camera apparatus to which the present invention can be applied.

The signal emitted from a CCD image pickup sensor 90 is separated into a luminance signal Y and chrominance signals R (red) and B (blue) in a circuit 92 for generating the luminance signal and separating colors.

Of the separated signals, the chrominance signals R and B are each entered into a matrix circuit 94 for generating the chrominance signals: R−Y and B−Y. The signal emitted from the matrix circuit 94 modulates the color difference signals R−Y and B−Y and the luminance signal Y in a color chrominance signal synthesizer 96 to obtain a chroma signal to synthesize a color television signal so that it is transmitted to the output of the color television signal or a recording portion for recording the color television signal. At this time, a color correction circuit 95 connected to the matrix circuit 94 forms a color correction signal corresponding to the color difference signal obtained from the matrix circuit 94 to perform a feedback control on gain control circuits 98a and 98b. In addition, the luminance signal Y is formed so as to suit the luminous efficacy of the human eye, which may be expressed as follows by three primary color signals (red, blue and green):

$$Y = 0.3R + 0.59G + 0.11B$$

As a result, the two color difference signals R−Y and B−Y result as follows:

$$\begin{aligned} R - Y &= R - (0.3R + 0.59G + 0.11B) \\ &= 0.70(R - G) - 0.11(B - G) \\ B - Y &= B - (0.3R + 0.59G + 0.11B) \\ &= 0.89(B - G) - 0.30(R - G) \end{aligned}$$

Here, a correspondent relationship is shown between a two-dimensional color coordinate system with the color difference signal G−B taken as the vertical axis and R−G taken as the horizontal axis, and a two-dimensional color coordinate system with the color difference signal B−Y taken as the vertical axis and R−Y taken as the horizontal axis. Since the vertical and horizontal axes each correspond to the axes resulting in G−B=0 and R−G=0 respectively, the axis corresponding to G−B=0 is expressed as 3(R−Y)+7(-B−Y)=0, and for the axis corresponding to R−G=0 is expressed as 89(R−Y)+11(B−Y)=0.

From the foregoing, it is understood that two color difference signals R−Y and B−Y are correlated with the color difference signals G−B and R−G. Therefore, the present invention is applied to the color correction circuit 95 for correcting the color according to the color difference signal resulting from the above-described matrix circuit 94. That is, when a color coordinate system correlated with the color coordinate system of the sixth embodiment is used, a similar advantage as in the sixth embodiment can be obtained.

The video signal for the video camera used in the above-described embodiment is a signal similar to the color television signal (the signal obtained by adding the synchronizing signal and the video signal), and for this signal system, there are available a NTSC system, PAL system, SECAM system and the like. This embodiment can be applied independently of those systems.

In addition, although, in the foregoing, an example in which the entire color region is adopted was described, an appropriate number of color regions may be adopted from the ones for the greater coincidence factors.

Incidentally, although, in the above-described embodiments, the color coordinate system was used, it is not necessarily restricted thereto, but a coordinate system comprising a lightness axis and a saturation axis or, in place of the lightness, a coordinate lightness such as (R+G+B) / 3, G density, $k1 \times R + k2 \times G + k3 \times B$ or the like may be used, or in place of the saturation axis, a color difference axis may be used. In addition, a color solid comprising a three-dimensional color coordinate system comprising hue, saturation and lightness axes may be used.

Next, an eighth embodiment is described in which the color picture printing apparatus shown in FIG. 3 is utilized.

The fuzzy inference rules of this embodiment are identical to those of the third embodiment which uses the feature values AV1 to AV4, including the fuzzy inference rules. In this embodiment, a membership function of the image data for the change of the image position at the aperture portion of the film carrier. This membership function may be determined as follows without taking the assumptions described in the third embodiment. First, the position of the photometric region relative to the screen (indicated by solid line), which can be seen from the aperture portion of the film carrier, is offset stepwise in the left- and rightward directions to form a histogram representing the differences ΔAVi (=AVi'−AV0i) between the feature value AVi' when the photometric region is offset and the feature value AV0i when the photometric region indicated by broken line of FIG. 6B lies at the regular position. Incidentally, FIGS. 6A and 6C each illustrate a state in which the photometric region is offset in the left- and rightward directions. This histogram results as shown in FIG. 7B. The most frequent portion of this histogram represents a portion (difference ΔAVi=0) where although the photometric region was offset, the feature value did not change. Therefore, the membership function is determined so that the membership value for the feature value AVi corresponding to the most frequent point of the histogram, that is, the coincidence factor, becomes 0.5 and the judging value AKi. Incidentally, the membership value for the feature value AVi (=judging value AKi) corresponding to the most frequent point of the histogram can be set to between 0.0 and 1.0. In addition, the feature values AVi each corresponding to the membership values 1.0 and 0.0 may be made to coincide with the least frequent point of the histogram or a range around this point or may be made to correspond to a range between the most frequent and the least frequent points. In addition, the membership value may be determined in accordance with other methods. For example, a film photographed by slightly offsetting the position of the identical objects is prepared and the membership function may be evaluated from the fluctuation or distribution of the fluctuations of the used feature value.

Figure 26:
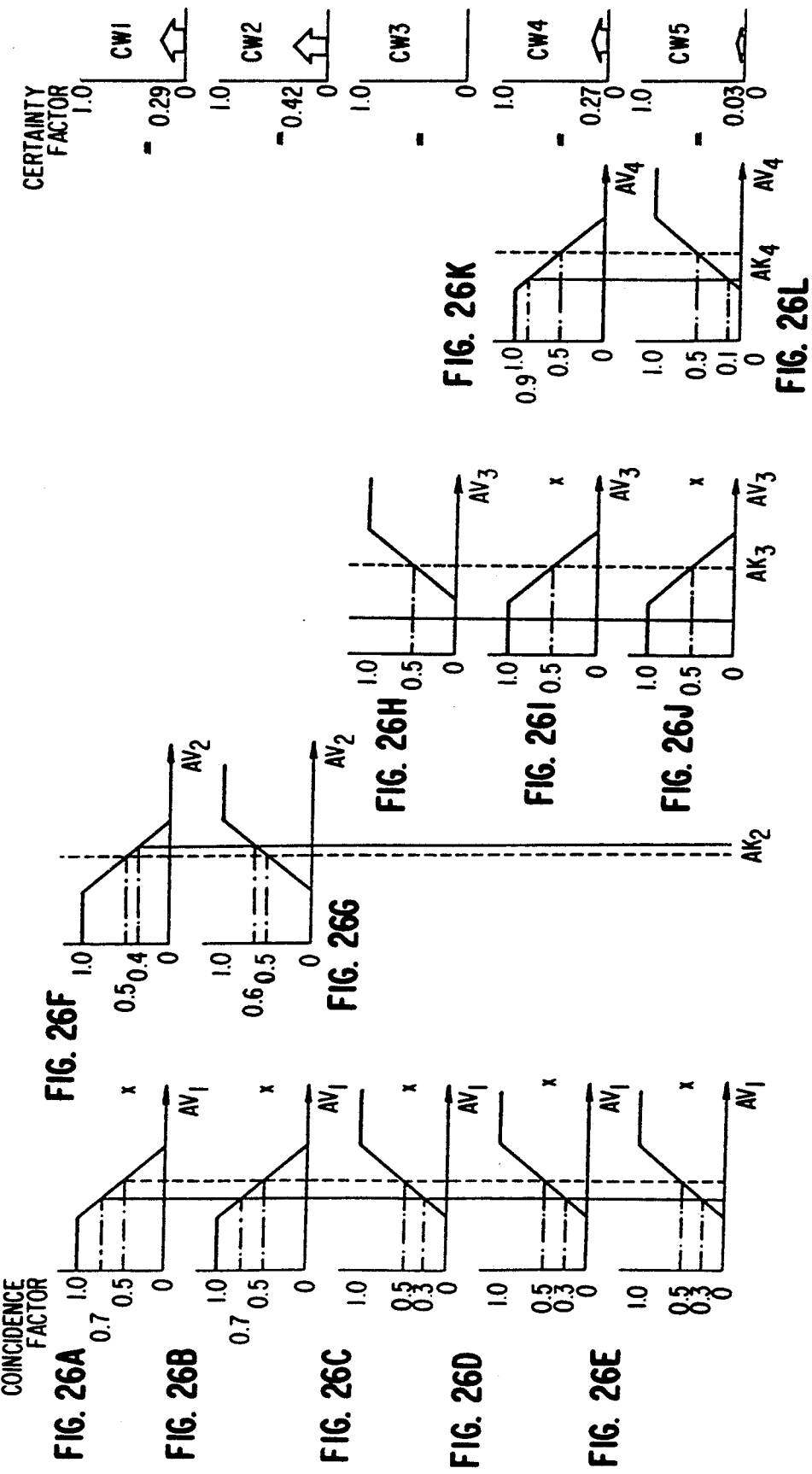
FIGS. 26A through 26L are respectively a diagrammatic view illustrating a membership function and the like of the fuzzy theory by algebraic product.
Figure 27:
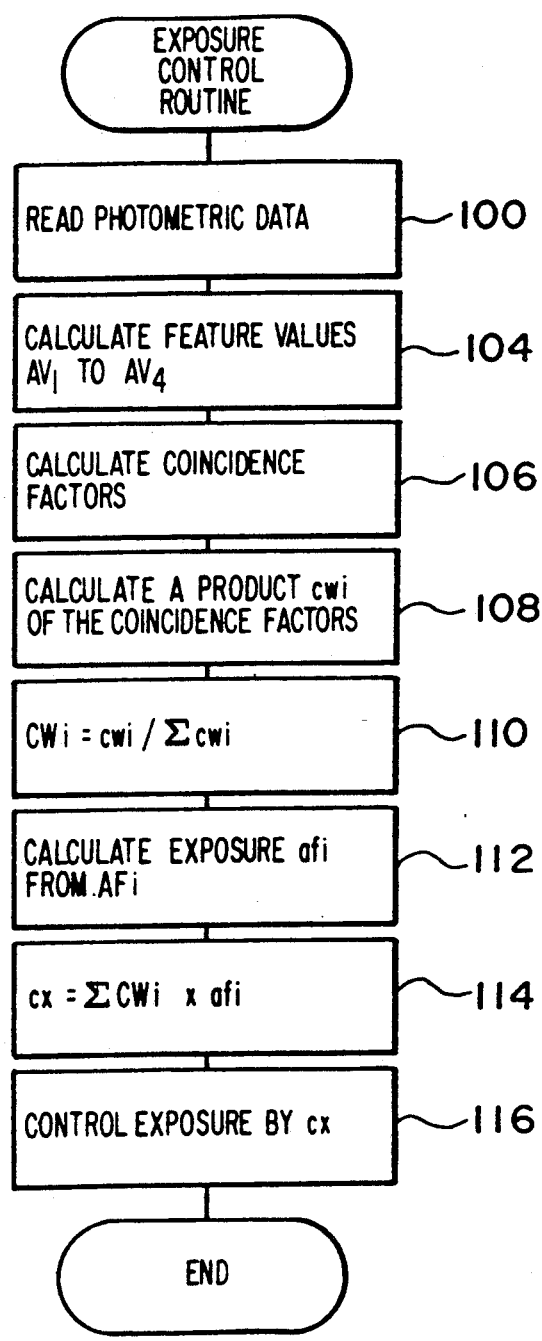
FIG. 27 is a flow chart illustrating an exposure control routine according to an eighth embodiment of the present invention.

When the membership function is defined according to the above-described method, the membership function for the feature value AV1 results as shown in FIG. 26. Referring to FIG. 26, only the reflection factor of FIG. 13 is replaced by the certainty factor and the other portions are identical to FIG. 13. Therefore, any further description is omitted. Next, referring to FIG. 27, an exposure control routine according to this embodiment for controlling the exposure using the membership function is described. In step 100, the photometric data detected by the sensor 28 is read and, in step 104, using the data, the above-described feature values AV1 to AV4 are calculated. In the next step 106, in accordance with the fuzzy inference rules (1) to (5) described with reference to the third embodiment, the coincidence factors each corresponding to the feature values AV1 to AV4 respectively are calculated from the membership functions shown in FIG. 26, that is, the coincidence factor with the judging condition is calculated for the feature values AV1 to AV4. In step 108, a product cwi of the coincidence factors, that is, the coincidence factor for each of the above-described five patterns is calculated for each of the rules (1) to (5) described with reference to the third embodiment. Since this coincidence factor for the pattern represents a certainty factor of the exposure evaluated from each exposure operational formula relative to the final exposure, it is described below as the certainty factor. In the example shown in FIG. 26, since, for the rule (1), the coincidence factor for the feature value AV1, that is, the membership value is 0.7 (indicated by solid line. the same applies hereinafter.) and the coincidence factor for the feature value AV2 is 0.4, the certainty factor becomes 0.7×0.4=0.28. For the rule (2), since the coincidence factor for the feature value AVi is 0.7 and the coincidence factor for the feature value AV2 is 0.6, the certainty factor cw2 becomes 0.7×0.6=0.42. For the rule (3), since the coincidence factor for the feature value AVi is 0.3 and the coincidence factor for the feature value AV3 is 0, the certainty factor cw3 becomes 0.3×0=0. For the rule (4), since the coincidence factor for the feature value AV1 is 0.3, the coincidence factor for the feature value AV3 is 1.0 and the coincidence factor for the feature value AV4 is 0.9, the certainty factor cw4 becomes 0.3×1.0×0.9=0.27. In addition, for the rule (5), since the coincidence factor for the feature value AV1 is 0.3, the coincidence factor for the feature value AV3 is 1.0 and the coincidence factor for the feature value AV4 is 0.1, the certainty factor cw5 becomes 0.3×1.0×0.1=0.03.

In the next step 110, in accordance with the following formula, a normalization of the reflection factor is performed.

$$CWi = cwi / \sum_{i=1}^{5} cwi \quad (14)$$

By so doing, $$\sum_{i=1}^{5} CWi = 1.0.$$

In the next step 112, the exposure afi is calculated (where: 1=1, 2 ... 5) and, in step 114, a weight corresponding to the normalized certainty factor CWi is applied to each of the exposure afi and, the value integrated as shown in the formula (15) is determined to be the final exposure CX.

$$CX = \sum_{i=1}^{} CWi \times cfi \quad (15)$$

In addition, the driver 30 is triggered by an exposure control value determined by this final exposure CX to control the position of the dimmer filter 60 to control the exposure.

Although, in the foregoing, an example in which the certainty factor is evaluated by calculating the product of the coincidence factors (in accordance with fuzzy inference by algebraic product) was described, as described below, the fuzzy inference by logical AND with the minimum value of the coincidence factors as the certainty factor may be used. That is, in an example shown in FIG. 28 using the same membership function as in FIG. 26, for the rule (1), since the coincidence factor for the feature value AV1, that is the membership value is 0.7 and the coincidence factor for the feature value AV2 is 0.4, the certainty factor cw1 is 0.4, which is the minimum value of 0.7 and 0.4. For the rule (2), since the coincidence factor for the feature value AV1 is 0.7 and the coincidence factor for the feature value AV2 is 0.6, the certainty factor cw2 is 0.6, which is the minimum value of 0.7 and 0.6. For the rule (3), since the coincidence factor for the feature value AV1 is 0.3 and the coincidence factor for the feature value AV3 is 0, the certainty factor cw3 is 0, which is the minimum value of 0.3 and 0. For the rule (4), since the coincidence factor for the feature value AV1 is 0.3, the coincidence factor for the feature value AV3 is 1.0 and the coincidence factor for the feature value AV4 is 0.9, the certainty factor cw4 is 0.3, which is the minimum value of 0.3, 1.0 and 0.9. In addition, for the rule (5), since the coincidence factor for the feature value AV1 is 0.3, the coincidence factor for the feature value AV3 is 1.0 and the coincidence factor for the feature value AV4 is 0.1, the certainty factor cw5 is 0.1, which is the minimum value of 0.3, 1.0 and 0.1.

When the distribution of the changing exposures according to this embodiment (according to the fuzzy inferences each by algebraic product and by logical AND), which are caused by the displacement of the film setting position as occurs when the identical original images are used to control the exposure is compared with that of the conventional example, a result similar to FIG. 9 was obtained.

Figure 29A:
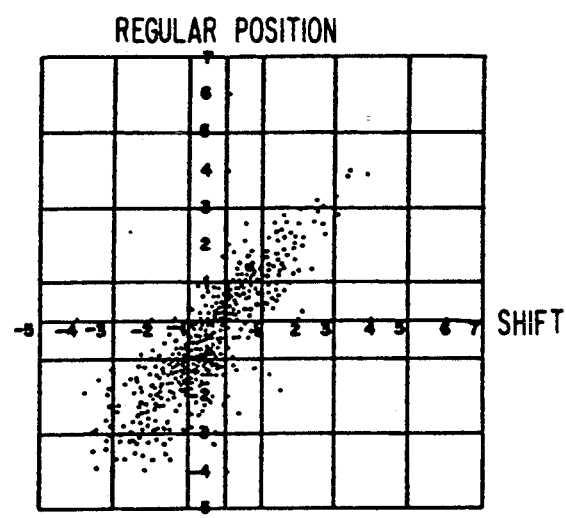
FIGS. 29A and 29B are respectively a diagrammatic view illustrating a correlation between the exposures in a conventional and the present embodiments.
Figure 29B:
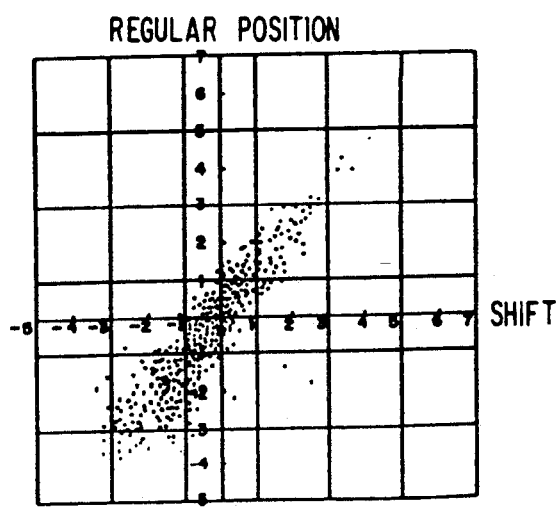

Next, a correlation between the exposure at the regular position and the exposure when the film is shifted 2.5 mm from the regular position is shown in FIG. 9 with reference to this embodiment and the conventional example. FIG. 29A illustrates a conventional correlation and FIG. 29B a correlation according to this embodiment. In addition, the vertical axes of FIGS. 29A and 29B each plot the exposures at the regular position while the horizontal axes plot the exposures after the film has been shifted from the regular position. The conventional correlation was 0.869 while the one for this embodiment is 0.920 exhibiting an intense correlation between the exposure at the regular position and the exposure after the film is shifted.

As described above, according this embodiment, even if the film setting position is offset, the change of the exposure is small and hence the difference of the exposure between the similar images becomes small with the result that a series of similar images is reproduced with uniform colors and densities.

Figure 30:
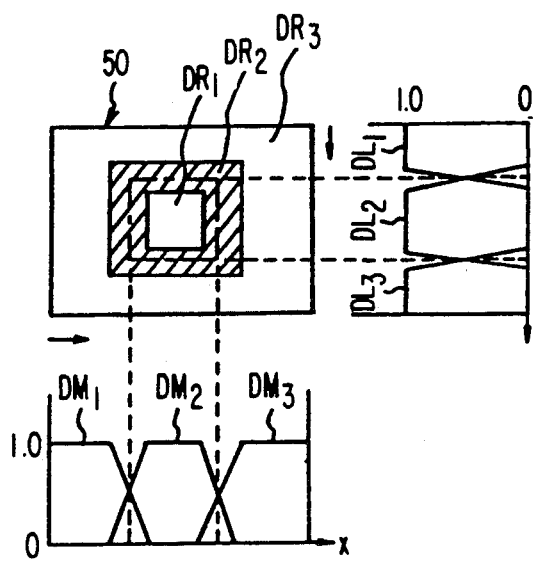
FIG. 30 is a diagrammatic view illustrating a relationship between the region of a ninth embodiment and the membership function.

Next, the fuzzy inference rules according to the ninth embodiment is described. First, in this embodiment, as shown in FIG. 30, the screen 50 of the color film is divided into the predetermined central region DR1 and the peripheral region DR3 providing an overlapping region DR2 therebetween. In addition, as the position data, the following distances x and y are adopted.

x: the distance of the pixels on the screen 50 as measured in the lateral direction, with the left side of the screen 50 taken as the origin y: the distance of the pixels on the screen as measured in the vertical direction, with the upper side of the screen 50 taken as the origin As the fuzzy inference rule, the following is used taking the form of statement: "if . . . , then . . .".

(1) if the distance x as measured in the lateral direction is medium and the distance y as measured in the vertical direction is medium. then the pixels exist in the central region.

(2) If the distance x as measured in the lateral direction is large and the distance y as measured in the vertical direction is large, then the pixels exist in the peripheral region.

(3) If the distance x as measured in the lateral direction is large and the distance y as measured in the vertical direction is small, then the pixels exist in the peripheral region.

(4) If the distance x as measured in the lateral direction is small and the distance y as measured in the vertical direction is large, then the pixels exist in the peripheral region.

(5) If the distance x as measured in the lateral direction is small and the distance y as measured in the vertical direction is small, then the pixels exist in the peripheral region.

The above-described language values, medium "large" and "small" are quantified by membership functions for the distances x and y, which will be later described. As shown in FIG. 30, there are the following membership functions: for the distance x membership functions DM1 and DM3 in which when the distance x assumes a value corresponding to the peripheral region DR3 the membership value becomes 1.0 and when it assumes a value corresponding to the overlapping region DR2 the membership value is changed between 1.0 and 0, and a membership function DM2 in which when the distance x assumes a value corresponding to the central portion DR1 the membership value assumes 1.0 and when it assumes a value corresponding to the overlapping region DR2 the membership value is changed between 1.0 and 0. In addition, there are three membership functions for the distance y: membership functions DL1 and DL3 in which when the distance y assumes a value corresponding to the peripheral region DR3 the membership value becomes 1.0 and when it assumes a value corresponding to the overlapping region DR2 the membership value is changed between 1.0 and 0, and a membership function in which when the distance y assumes a value corresponding to the central region DR1 the membership value becomes 1.0 and when it assumes a value corresponding to the overlapping value DR2 the membership value is changed between 1.0 and 0. Incidentally, since the displacement of the image frame as measured in the vertical direction is generally small, a slope of the overlapping region of the membership function relative to the distance y is greater than the slope of the overlapping region of the membership function relative to the distance x.

The above-described membership functions are previously stored within the ROM of the exposure control circuit 40.

Figure 31:
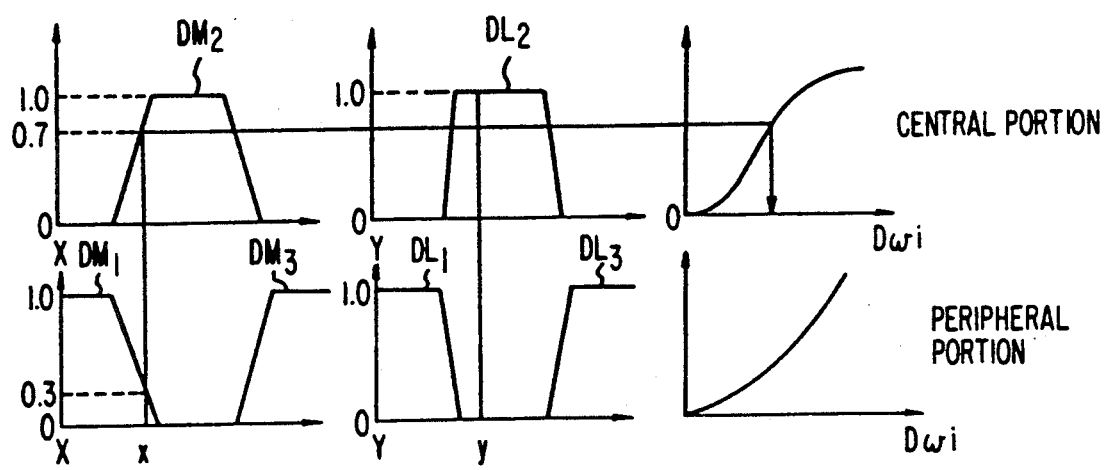
FIG. 31 is a diagrammatic view for revealing how a weight is evaluated.
Figure 32:
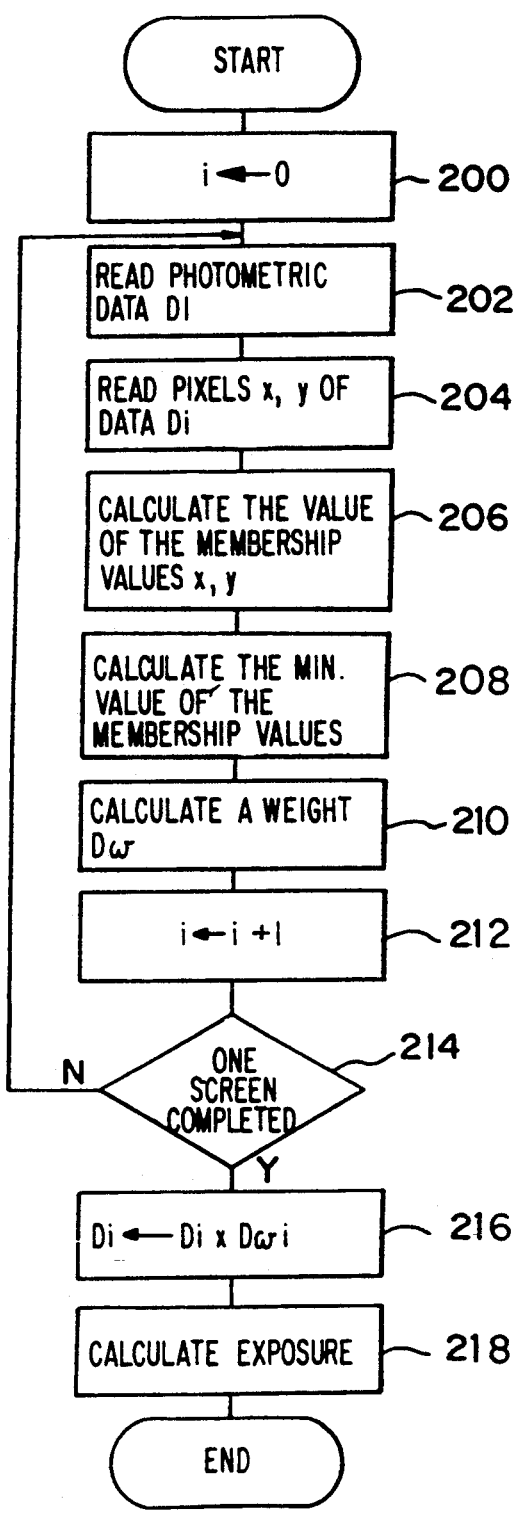
FIG. 32 is a flow chart illustrating an exposure operational formula according to a ninth embodiment.

Next, referring to FIG. 32, an exposure control routine according to this embodiment for controlling the exposure using the above-described membership function is described. The count value i is set to the initial value (0) and, in step 200, the photometric value detected by the sensor 28 (FIG. 3) is read while, in step 204, the distances x and y of the pixels of the photometric data Di are read. In step 206, the membership value is evaluated based on the membership function described above. If this membership value is described with reference to the pixels assigned a sign x in FIG. 30, as shown in FIG. 31, the membership value for the distance x is 0.3 for the membership function DM1 and 0.7 for the membership function DM2, and the membership value for the distance y is 1.0 for the membership function DL2.

In the next step 208, the minimum value of the membership values for the central region DR1 (0.7 in the above-described example because the membership values are 0.7 and 1.0) and the minimum value of the membership values for the peripheral region DR2 (0 in the above-described example because the membership values are 0.3 and 0) are evaluated. In the next step 210, the weight of the above-described minimum values is each calculated and the larger weight is defined as DWi (i=1, 2, 3 . . . n, n denotes the entire number of pixels.). Then, in step 212, the count value is incremented by one and, in step 214, by determining whether i≧n or not, it is determined whether the weights DWi for the entire pixels of a screen were evaluated or not. If no, then the above-described steps are each repeated and, if yes, then the procedure is shifted to step 216, where values obtained by multiplying wi with each of the photometric data Di are taken as new photometric data Di and, in step 218, this new data Di is used to calculate the exposure.

From the foregoing, it will be apparent that the variation of the exposure to be determined can be reduced for displacement of the film setting position on the film carrier and that the exposure can be determined stably and with excellent reproducibility.

What is claimed is:

1. A method of determining an exposure for use in an image forming apparatus, in which the exposure is determined based on either one of an exposure condition and an exposure operational formula defined for each of a plurality of previously classified patterns, said method comprising the steps of:

dividing a color original image into a multiplicity of portions for photometric purposes;

evaluating a plurality of feature values of said color original image based on photometric data obtained from each portion;

evaluating a weight for each pattern from a coincidence factor for each of said plurality of patterns; and applying said weight to each exposure value evaluated from said one of a plurality of said exposure conditions and said exposure operational formula by the use of said feature values to determine a specific exposure.

2. A method of determining an exposure for use in an image forming apparatus as set forth in claim 1 wherein a coincidence factor with a judging condition for each of said feature values is evaluated, the judging condition judging the magnitude of the feature values, and said coincidence factor for each of said plurality of patterns is determined by the use of a plurality of said coincidence factors for each of the feature values.

3. A method of determining an exposure for use in an image forming apparatus as set forth in claim 2 wherein said coincidence factor for each of said patterns is determined by a product of said coincidence factors with the judging condition.

4. A method of determining an exposure as set forth in claim 2 wherein said coincidence factor with the judging condition is determined according to a difference between a predetermined value and said feature value so that when the difference equals 0 the coincidence factor is set to between 0 and 1.0.

5. A method of determining an exposure as set forth in claim 3 wherein said coincidence factor with the judging condition is determined according to a difference between a predetermined value and said feature value so that when the difference equals 0 the coincidence factor is set to between 0 and 1.0.

6. A method of determining an exposure as set forth in claim 2 wherein said coincidence factor with the judging condition is determined based on how frequently the magnitude of said feature value emerges and the coincidence factor for the most frequently emerging value is set to between 0 and 1.0.

7. A method of determining an exposure as set forth in claim 3 wherein said coincidence factor with the judging condition is determined based on how frequently the magnitude of said feature value emerges, and the coincidence factor of the most frequently emerging value is set to between 0 and 1.0.

8. A method of determining an exposure for use in an image forming apparatus wherein the exposure is determined based on either one of an exposure condition and an exposure operational formula set to each of a plurality of previously classified patterns, said method comprising the steps of:
   dividing a color original image into a multiplicity of portions for photometric purposes:
   evaluating a plurality of feature values of said color original image based on photometric data obtained from each portion;
   for each of said feature values, evaluating a coincidence factor from a plurality of judging conditions, the judging conditions each defining the coincidence so that the more the feature value satisfies the condition on the judged value the greater the coincidence factor becomes while the less the feature value satisfies the condition on the judged value the smaller the coincidence factor becomes;
   synthesizing a plurality of the coincidence factors with the judging condition to determine a coincidence factor for each of said plural patterns;
   evaluating a weight for each pattern from said coincidence factors for the patterns; and
   determining a specific exposure by a weighted mean resulting from applying said weight to each exposure determined according to said exposure condition and exposure operational formula.

9. A method of determining an exposure as set forth in claim 8 wherein said coincidence factor with the judging condition is evaluated according to a difference between a predetermined value and said feature value so that when the difference equals 0 the coincidence factor is set to between and 1.0.

10. A method of determining an exposure as set forth in claim 8 wherein said judging condition compares said feature value with the judging value, and when the feature value equals the judging value, the coincidence factor is set to between 0 and 1.0.

11. A method of determining an exposure as set forth in claim 8 wherein said exposure operational formula is a functional expression of said feature values.

12. A method of determining an exposure as set forth in claim 9 wherein said exposure operational formula is a functional expression of said feature values.

13. A method of determining an exposure for use in an image forming apparatus wherein the exposure is controlled based on either one of an exposure condition and an exposure operational formula defined for each of a plurality of divided regions on a present coordinate, said method comprising the steps of:
   dividing a color original image into a multiplicity of portions for photometric purposes;
   evaluating a plurality of feature values of said color original image from resulting photometric data obtained from each portion, said plurality of feature values including the resulting photometric data;
   judging to which of said divided regions the resulting photometric data belongs to classify said plurality of feature values;
   for each of said feature values, evaluating a coincidence factor from a plurality of judging conditions, the judging conditions each defining the coincidence factor so that the more the feature value satisfies the judging condition the greater the coincidence factor becomes while the less the feature value satisfies the judging condition the smaller the coincidence factor becomes;
   synthesizing a plurality of the coincidence factors with the judging condition for either one of a plurality of said exposure conditions and exposure operational formulas to determine a coincidence factor;
   evaluating a weight for either an exposure condition or exposure operational formula from said coincidence factor; and
   determining a specific exposure by a weighted mean resulting from applying said weight to each exposure evaluated from either said exposure condition or exposure operational formula.

14. A method of determining an exposure as set forth in claim 13 wherein a weight changed according to the magnitude of a color difference or color ratio or a weight changed according to the amount of the photometric data belonging to said region is defined for each of the divided regions while the feature value for said region is evaluated from the photometric data for each of the divided regions to control the exposure.

15. A method of determining an exposure as set forth in claim 13 wherein said exposure operational formula is expressed in the form of a functional expression of said feature values.

16. A method of determining an exposure asset forth in claim 14 wherein said exposure operational formula is expressed in the form of a functional expression of said feature values.

17. A method of determining an exposure for use in an image forming apparatus comprising the steps of:
   dividing a color film image into a multiplicity of portions for photometric purposes;
   for the resulting image data obtained from each portion, evaluating a certainty factor on the basis of a membership function of the image data corresponding to a displacement of said film image in an aperture portion of a film carrier;
   evaluating a weight by synthesizing a plurality of certainty factors; and
   applying the weight to the image data of a photometric point to determine a specific exposure.

18. A method of determining an exposure as set forth in claim 17 wherein said image data relates to feature values used for determining the exposure for the color film image.

19. A method of determining an exposure as set forth in claim 17 wherein said image data relates to density at the divided point on a film image.

* * * * *